United States Patent
Freedman et al.

(10) Patent No.: US 10,467,805 B2
(45) Date of Patent: Nov. 5, 2019

(54) IMAGE RENDERING OF LASER SCAN DATA

(71) Applicant: AVEVA SOLUTIONS LIMITED, Cambridge, Cambridgeshire (GB)

(72) Inventors: Aaron Freedman, Chelmsford, MA (US); Paul Elton, Cambridge (GB)

(73) Assignee: Aveva Solutions Limited, Cambridge (GB)

( * ) Notice: Subject to any disclaimer, the term of this patent is extended or adjusted under 35 U.S.C. 154(b) by 0 days.

(21) Appl. No.: 15/103,114

(22) PCT Filed: Dec. 5, 2014

(86) PCT No.: PCT/GB2014/053616
§ 371 (c)(1),
(2) Date: Jun. 9, 2016

(87) PCT Pub. No.: WO2015/087055
PCT Pub. Date: Jun. 18, 2015

(65) Prior Publication Data
US 2016/0307369 A1    Oct. 20, 2016

(30) Foreign Application Priority Data

Dec. 13, 2013  (GB) .................................. 1322113.0

(51) Int. Cl.
*G06T 17/20*    (2006.01)
*G06T 15/40*    (2011.01)
(Continued)

(52) U.S. Cl.
CPC ............ *G06T 17/20* (2013.01); *G06T 15/005* (2013.01); *G06T 15/04* (2013.01); *G06T 15/405* (2013.01);
(Continued)

(58) Field of Classification Search
None
See application file for complete search history.

(56) References Cited

U.S. PATENT DOCUMENTS 5,847,717 A * 12/1998 Berry ........................ G06T 1/00
                                                    345/506
5,920,320 A *  7/1999 Shimizu .................. G06T 17/00
                                                    345/422
(Continued)

FOREIGN PATENT DOCUMENTS

EP          1176393 A2    1/2002
JP        2005208868 A    8/2005
(Continued)

OTHER PUBLICATIONS

PCT International Search Report and Written Opinion from PCT/GB2014/053616 dated May 6, 2015.
(Continued)

*Primary Examiner* — Kyle Zhai
(74) *Attorney, Agent, or Firm* — Stroock & Stroock & Lavan LLP

(57) ABSTRACT

A method of rendering an image of three-dimensional laser scan data is described. The method includes providing a set of laser scan data for a given scan as a spherical displacement map and generating a tessellation pattern by sampling the spherical displacement map. A graphics processing unit may generate the tessellation pattern.

12 Claims, 27 Drawing Sheets

(51) Int. Cl.
*G06T 19/00* (2011.01)
*G06T 15/00* (2011.01)
*G06T 15/04* (2011.01)
*G06T 19/20* (2011.01)

(52) U.S. Cl.
CPC .............. *G06T 19/00* (2013.01); *G06T 19/20* (2013.01); *G06T 2215/16* (2013.01)

(56) References Cited

U.S. PATENT DOCUMENTS

| | | | |
|---|---|---|---|
| 6,420,698 B1* | 7/2002 | Dimsdale | G01S 7/4811 250/205 |
| 8,509,520 B2 | 8/2013 | Chen | |
| 2001/0002131 A1* | 5/2001 | DeRose | G06T 13/40 345/423 |
| 2005/0216237 A1* | 9/2005 | Adachi | G06T 17/00 703/1 |
| 2010/0079454 A1 | 4/2010 | Legakis et al. | |
| 2012/0294534 A1 | 11/2012 | Watanabe et al. | |
| 2014/0028678 A1* | 1/2014 | Chmielewski | G06T 5/002 345/426 |
| 2014/0176535 A1* | 6/2014 | Krig | G06T 15/04 345/419 |

FOREIGN PATENT DOCUMENTS

| | | |
|---|---|---|
| JP | 2011192214 A | 9/2011 |
| JP | 2012230594 A | 11/2012 |
| JP | 2012527025 A | 11/2012 |
| RU | 2168192 C2 | 5/2001 |
| RU | 2497194 C2 | 10/2013 |
| WO | 96/21171 A3 | 7/1996 |
| WO | 2004003844 A1 | 8/2004 |
| WO | 2009/047287 A1 | 4/2009 |
| WO | 2010/130987 A2 | 11/2010 |
| WO | 2010130650 A1 | 11/2010 |
| WO | 2013/142819 A1 | 9/2013 |
| WO | 2015087055 A1 | 6/2015 |

OTHER PUBLICATIONS

Search Report from British Patent Application No. GB1322113.0 dated Jun. 10, 2014.
Gopi M. et al., "A Fast and Efficient Projection-based Approach for Surface Reconstruction" Computer Graphics and Image Processing, pp. 179-186, Oct. 7, 2012.
V. Sequeira et al., "Automated Reconstruction of 3D Models from Real Environments", ISPRS Journal of Photogrammetry and Remote Sensing, pp. 1-22, Feb. 1, 1999.
Rusinkiewicz S., et al., "Qsplat: A Multiresolution Point Rendering System for Large Meshes", Computer Graphics, pp. 343-352, Jul. 23, 2000.
Liang Wan et al., "Isocube: Exploiting the Cubemap Hardware", IEEE Transactions on Visualization and Computer Graphics, vol. 13, No. 4, pp. 720-731, Jul.-Aug. 2007.
Morooka K. et al., "Computations on a Spherical View Space for Efficient Planning of Viewpoints in 3-D Object Modelling", Second International Conference on 3-D Digital Imaging and Modeling, pp. 138-147, 1999.
T. Asai et al, "3D Modelling of a Read World Scene Using an Omnidirectional Rangefinder and an Omnidirectional Camera for Walkthrough", Information Processing Society of Japan, pp. 73-78, Jan. 16, 2004.

* cited by examiner

IMAGE RENDERING OF LASER SCAN DATA

CROSS-REFERENCE TO RELATED APPLICATIONS

This application is the National Stage of International Application No. PCT/GB2014/053616, filed on Dec. 5, 2014, which claims the benefit of United Kingdom Patent Application No. GB1322113.0, filed Dec. 13, 2013. The contents of all of these applications are incorporated herein by reference.

FIELD OF THE INVENTION

Various embodiments of the present invention relate to a method of, and a system for, rendering an image of laser scan data.

BACKGROUND

A three-dimensional laser scanner can be used to survey an environment such as a process plant, vessel or other facility. A typical scanner includes a laser rangefinder which can measure a distance between the scanner and a point on a surface which is in view. By sweeping through a field of view (typically 360 degrees horizontally and nearly 180 vertically), the scanner can capture a set of ranges (herein referred to as "laser scan data") for the surrounding environment. These can be used to generate a set of points in three-dimensional space, often referred to as a "point cloud". An example of a point cloud is described in EP 1 176 393 A2.

Multiple scans can be performed at different positions in an environment and point clouds from different scans can be combined to produce a combined (or "aggregated") point cloud covering a wider area. An example of combining point cloud data can be found in WO 2004/003844 A1.

In addition to acquiring range data, the scanner can also capture images of the surrounding environment by measuring intensity of reflected laser light or using a camera.

The point cloud(s) and images can be used to visualize and/or analyze an environment using a point cloud viewer application or a three-dimensional computer-aided design (CAD) application. Typically, these applications fall into two categories, namely those that work with points from individual scans and those that work with points combined from multiple scans.

One of the simplest applications of laser scanning is to display an image captured by an individual scan. Because the image from a laser scan is spherical, covering the area around the laser scanner, the software application can map the image onto the inside of a sphere. The application can display a portion of the sphere on a computer screen. The user can rotate the view in order to view different portions of the entire image. This presentation is called a "bubble view".

In bubble view, the user can select a spot on the image and retrieve the three-dimensional coordinate of that location using the point cloud data for that laser scan. By selecting two points, the user can measure distances.

One type of application can overlay a three-dimensional CAD model in a bubble view. Because the application knows the three-dimensional location of the points in bubble view, it can obscure the appropriate portions of the CAD model behind the bubble view. This combined image can be useful when designing new areas of the facility.

An appealing feature of a bubble view is that it looks realistic. Realism comes from the image captured at the scanner location. A limitation of bubble views is, however, that they can only be produced for the locations at which a laser scanner was positioned. A user can select a bubble view and rotate to the left and right or up and down, but he/she cannot move forward, backward, horizontally or vertically in order to view the environment from a different perspective.

To allow free roaming, some software applications work with a combined point cloud from multiple scans. Using such an application, a user chooses a location within a facility and a viewing direction. The application then displays each point in the combined point cloud around that location from the point of view of the user. The user can move the viewing location and direction to see the points from different perspectives.

Some applications can display a CAD model in the same three-dimensional space as the combined point cloud. A user can then measure distances between locations in the CAD model and points in the point cloud. The user can also determine if portions of the point cloud intersect portions of the CAD model.

Although displaying a combined point cloud allows the user to view points from more than one perspective, this approach can have one or more drawbacks.

Displaying individual points tends to be computationally expensive. Gaps can appear in a representation of a scanned surface at close distances and so it can become difficult to discern the surfaces.

SUMMARY

According to a first aspect of the present invention there is provided a method of rendering an image of three-dimensional laser scan data. The embodiment method comprises providing a set of laser scan data for a given scan as a spherical displacement map and generating a tessellation pattern by sampling the spherical displacement map. The embodiment method comprises rendering the image using the tessellation pattern.

By preserving laser scan data for a given scan as a set of points (as opposed to aggregating laser scan data for multiple scans) and by taking advantage of the fact that the laser scan data can be provided in the form of a displacement map which can be handled directly by a graphics system, an image of the laser scan data can be rendered efficiently and/or quickly. This can be particularly helpful when combining images from multiple scans since each scan can be processed independently and the images from different scans can be easily combined in a common buffer. This allows efficient/fast rendering not only of static images, but also moving images, for example, as a user "walks through" the environment.

Providing the set of laser scan data for the given scan as the spherical displacement map may comprise receiving a set of laser scan data generated by a laser scanner at a given location and copying a value of range for a given laser scan point at a given azimuth and a given elevation from the laser scan data into a respective texel of a two-dimensional texture (or higher-dimensional texture) at a texel position corresponding to the given azimuth and the given elevation.

The method may comprise a graphics processing unit (GPU) generating the tessellation pattern. However, the method may comprise a central processing unit (CPU) generating the tessellation pattern.

The processing unit may be configured using Microsoft® DirectX® 11 (or later) or OpenGL 4.4 (or later) application programming interface (API).

The method may further comprise identifying discontinuities between adjacent points in the spherical displacement map and marking the adjacent points. Marking the adjacent points may comprise setting the displacement value to a predefined number, such as a 0 or −1.

The method may further comprise generating a normal map in dependence upon said spherical displacement map. The displacement map and normal map may be combined in one texture. The one texture may comprise at least four channels.

Generating the normal map may comprise calculating a normal for each point in the spherical displacement map and storing the normal in the normal map. The normal may comprise first, second and third vector component values.

The method may further comprise generating a blending texture in dependence upon the spherical displacement map. The blending texture may comprise an array of blending texels, each blending texel comprising a value which depends on distance from a discontinuity.

The method may further comprise generating a patch map for a given scan, the patch map comprising a plurality of patches.

The patch map may comprise polygonal patches, each patch having three or more vertices. The patches may be the same shape. The patches may be the same size. The patches may be rectangles. If the patches are rectangles, then the patch map may comprise positions of opposite vertices.

Position, shape and/or size of the patches may depend on discontinuities in the spherical displacement map.

The patch map may include a relative tessellation level for each patch. The method may comprise setting the relative tessellation level of a given patch in dependence upon discontinuities. The method may comprise setting the relative tessellation level of a given patch in dependence upon normal variance across the given patch.

The method may comprise calculating an absolute tessellation level for a given patch in dependence upon a view position and/or visibility of the given patch.

The method may further comprise determining whether a vertex forming part of a triangle in the tessellation pattern is marked as being on or adjacent to a discontinuity and, in dependence upon determining that the vertex is invalid, culling (or "discarding") the triangle.

The method may further comprise generating a set of pixels for the scan and performing a depth test.

The method may comprise colouring a pixel in dependence upon the normal of the pixel. The method may comprise colouring a pixel in dependence upon intensity and/or colour in a corresponding part of an image.

The method may comprise providing more than one set of laser scan data, each set of laser scan data corresponding to a respective scan. Each set of laser scan data is provided as a respective spherical displacement map. The method may comprise combining rendered images from different scans. Combining rendered images from different scans may comprise using a depth buffer.

According to a second aspect of the present invention there is provided a computer program which comprises instructions for performing the method.

According to a third aspect of the present invention there is provided a computer readable medium or non-transitory computer-readable medium which stores the computer program.

According to a fourth aspect of the present invention there is provided computer system comprising memory and at least one processing unit. The memory stores a set of laser scan data for a given scan as a spherical displacement map and the at least one processing unit is (are) configured to generate a tessellation pattern by sampling the spherical displacement map.

The at least one processing unit may comprise at least one graphical processing unit. The at least one processing unit may comprise at least one central processing unit. The at least one processing unit may comprise one processing unit, for example, one graphical processing unit.

The at least one processing unit may be configurable using a Microsoft® DirectX® 11 (or later) application programming interface. The at least one processing unit may be configurable using OpenGL application programming interface.

BRIEF DESCRIPTION OF THE DRAWINGS

Certain embodiments of the present invention will now be described, by way of example, with reference to the accompanying drawings, in which.

DETAILED DESCRIPTION OF THE CERTAIN EMBODIMENTS

System Overview

Figure 1:
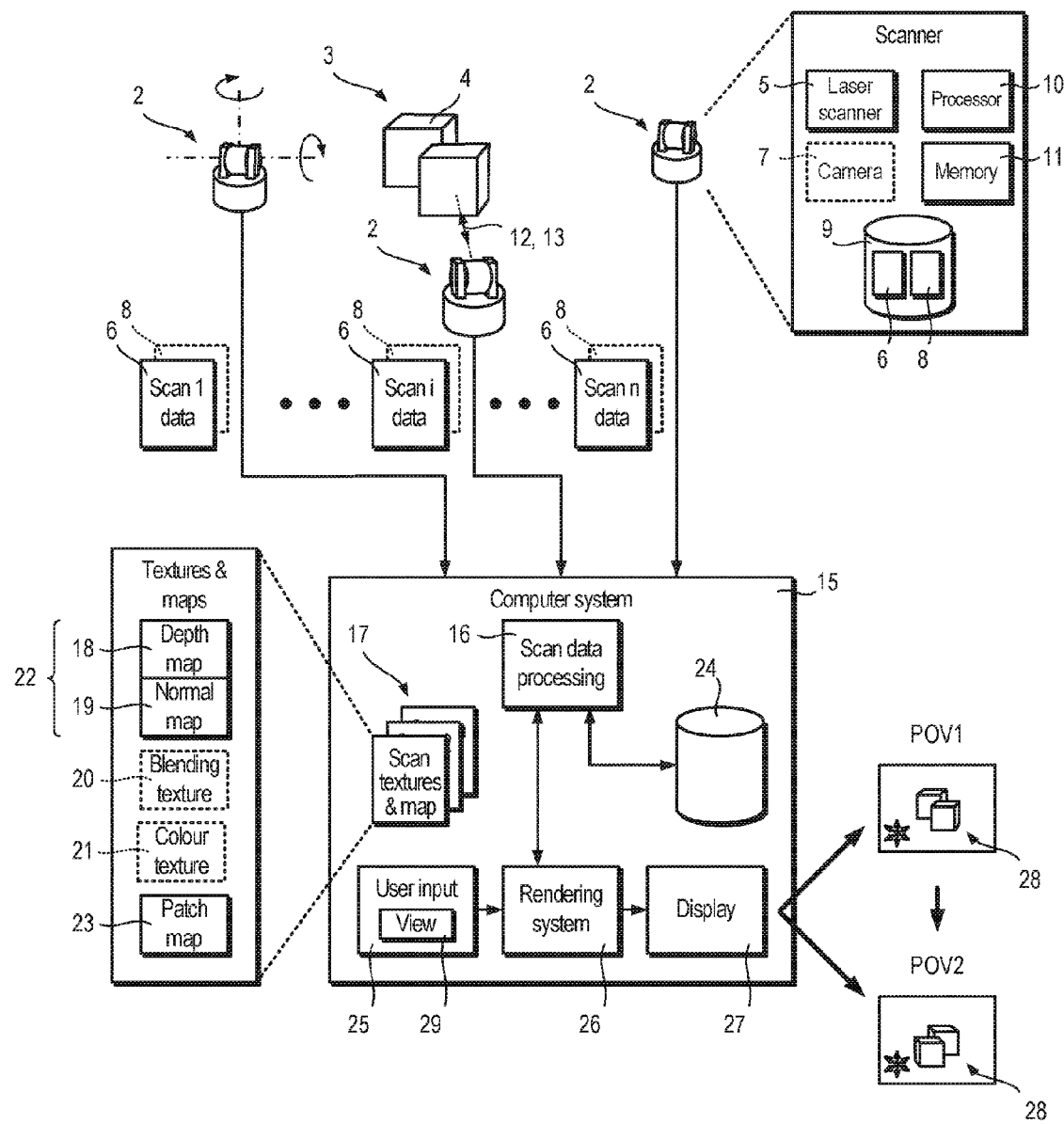
FIG. 1 is a schematic block diagram of a system for obtaining and processing laser scan data, and rendering an image.

Referring to FIG. 1, an embodiment system 1 for generating and processing laser scan data and for rendering an image is shown.

The system 1 includes one or more three-dimensional laser scanners 2 for surveying an environment 3 which includes a number of target surfaces 4. The, or each, laser scanner 2 includes a laser scanning unit 5 which generates laser scan data 6 (herein referred to simply as "scan data"), an optional camera 7 which can be used to generate image data 8, for example in the form a JPEG file, and on-board storage 9 for storing data 6, 8. The, or each, laser scanner 2 includes processor(s) 10 and memory 11 which can be used to process the laser scan data 6, for example, to format the data. A separate computer system (not shown) can be used to process the data.

The laser scanning unit 5 generates an element of scan data 6 for a point by emitting a pulsed laser beam 12 in a given direction (i.e. at given a horizontal angle and a given vertical angle), sensing the reflected beam 13 that is reflected off a target surface 4, back to the laser scanner 2, and determining a range to the target surface 4 based on time of flight of the laser beam 12, 13. A set of scan data 6 can be acquired by scanning the laser beam 12 horizontally and vertically so as to build up a set of points around the scanner 2. Each point in the scan data 6 can be provided in the form of a set of Cartesian coordinates, i.e. each point is expressed in (x, y, z). Points in a set of data 6 can be ordered by azimuth and elevation.

The scan data 6 and, optionally, image data 8 are supplied to a computer system 15 which includes a scan data processing module 16 which generates a set 17 of textures 18, 19, 20, 21, some textures combined into a single texture 22, and a patch map 23 for each scan. The computer system 15 also includes storage 24 in the form of one or more hard drives for storing data. The hard drive(s) may be hard disk drives, solid-state drive, optical drive or other form of suitable storage.

As will be explained in more detail later, the set of textures 17 include a spherical displacement map 18 (herein also referred to as a "depth map") and a normal map 19 obtained from scan data 6. As will also be explained in more detail later, the displacement map 18 and the normal map 19 are combined in a single, 4-channel texture 22 (herein referred to as a "combined texture").

The set of textures 17 can include a blending map 20. The set of textures 17 can include a colour map 21 obtained from the image data 8.

The computer system 15 includes a user input devices 25 (such as a mouse and/or keyboard), a rendering system 26 and a display 27 for displaying an image 28 from a view point 29 which is supplied by the user via a user input device 25. The rendering system 26 produces triangulated three-dimensional surfaces using the set of textures 17 and the patch map 23 obtained from one or more different scans and renders the surfaces in real time, from any view point, combining surfaces obtained from the scan(s) in an image 28.

The scan data processing module 16 and the rendering system 26 may be implemented in different computer systems. For example, the scan data processing module 16 may be implemented all or in part by a laser scanner 2. Alternatively, the laser scanner 2 may generate the displacement map 18 and a first computer system may generate the other texture(s) 19, 20, 21 and the patch map 23, or just the patch map 23, and supply texture(s) 18, 19, 20, 21 and patch map 23 to a second computer system which implements the rendering system 26.

Figure 2:
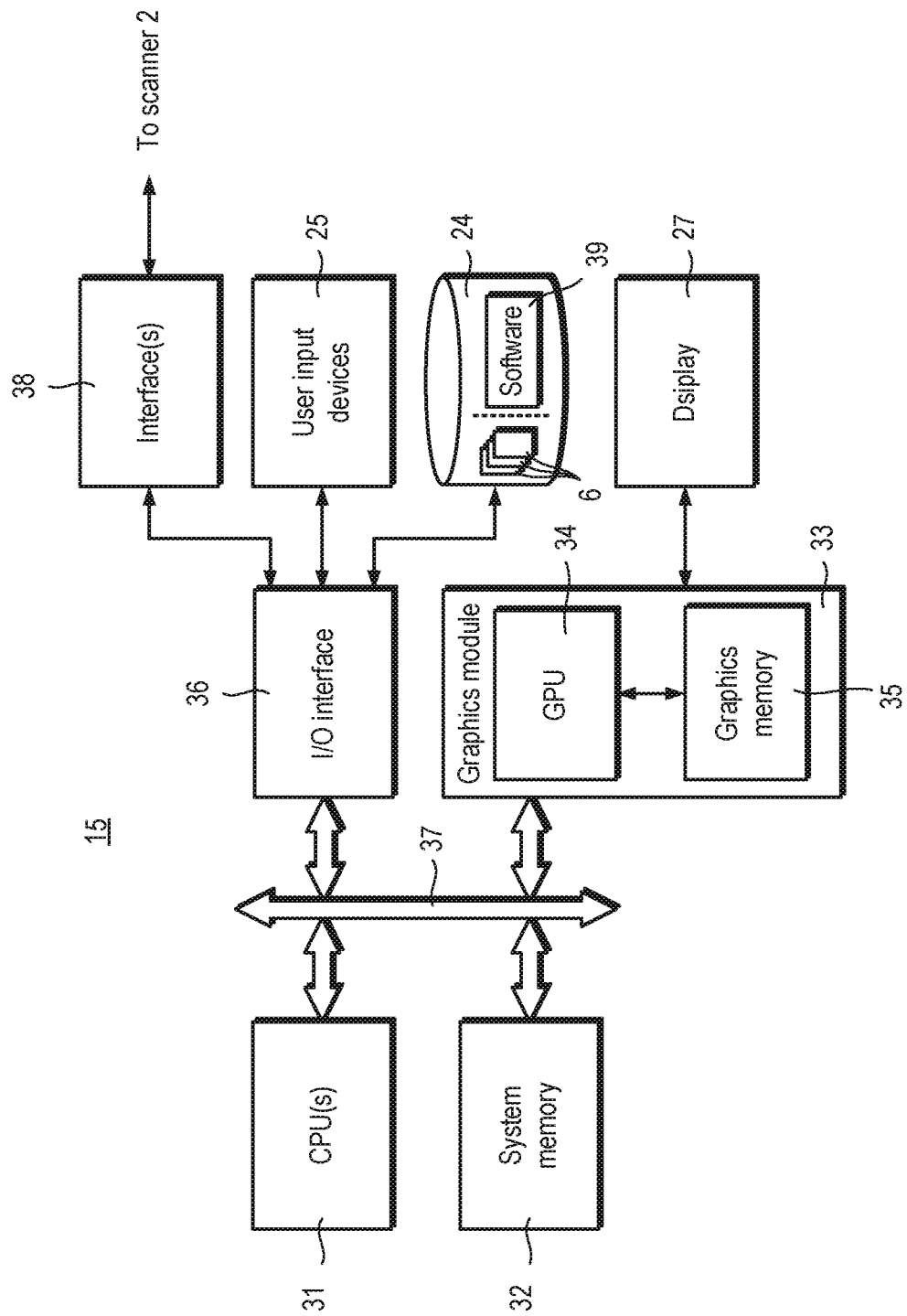
FIG. 2 is a schematic block diagram of a computer system which can be used to process laser scan data and render an image.

Referring also to FIG. 2, the computer system 15 is shown in more detail.

The computer system 15 includes one or central processing units (CPUs) 31 having respective memory caches (not shown), system memory 32, a graphics module 33, for example in the form of a graphics card, which includes a graphics processing unit (GPU) 34 and graphics memory 35 (which may be referred to as "video RAM"), and an input/output (I/O) interface 36 operatively connected by a bus 37. An example of a suitable graphics module 33 is an NVIDIA® GeForce 460 GPU with 1 GB of video RAM.

The I/O interface 36 is operatively connected to bus and/or network interface(s) 38 (such as USB interface or WLAN interface) for receiving scan data 6 from the, or each, scanner 2. The I/O interface 36 is also operatively connected to user input devices 25 and the storage 24, for example, in the form of one or more hard disk drives and/or solid-state drives. Some peripheral devices, such as removable storage, and other computer components are not shown. The computer system 15 may have a different configuration from that shown in FIG. 2.

The scan processing module 16 is implemented in software. Computer code 39 for implementing the scan processing module 16 is held in storage 24 and loaded into memory 32 for execution by the CPU(s) 31.

The rendering system 26 is preferably implemented using a GPU so as to take advantage of the enhanced graphics processing capabilities of a GPU, in particular tessellation. However, the rendering system 26 can be implemented using one or more CPUs.

As will be explained in more detail later, the rendering system 26 implements a graphics pipeline 60 (FIG. 14) which includes a plurality of modules 61, 62, 63, 64, 65, 66, 67, 68 (FIG. 14) including programmable and fixed-function shaders 61, 62, 63, 64, 65, 67, 68 and a rasterizer 66.

Scan Processing

Figure 3:
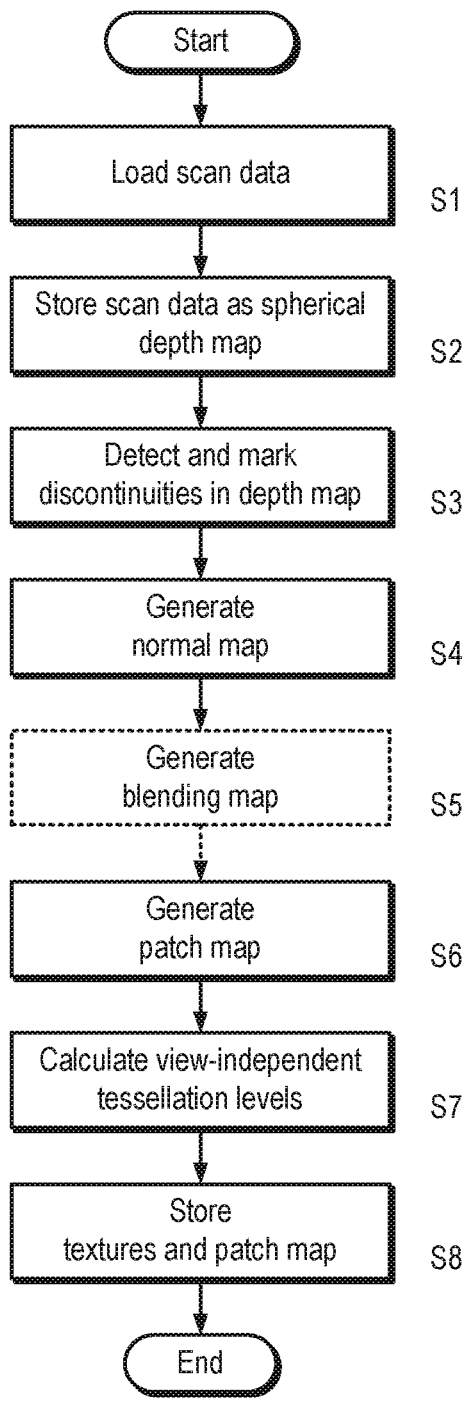
FIG. 3 is a process flow diagram of a method of processing laser scan data.

Referring to FIGS. 1, 2 and 3, operation of the scan data processing module 16 will now be described in more detail.

The module 16 loads a set of scan data 6 for a scan from a scanner 2 via a bus or network (not shown) or portable storage (not shown) and/or from storage 24 (step S1). The scan data 6 is in, for example, Cartesian coordinates and so the module 16 converts and stores the scan data 6 as a spherical displacement map 18 (step S2).

Figure 4:
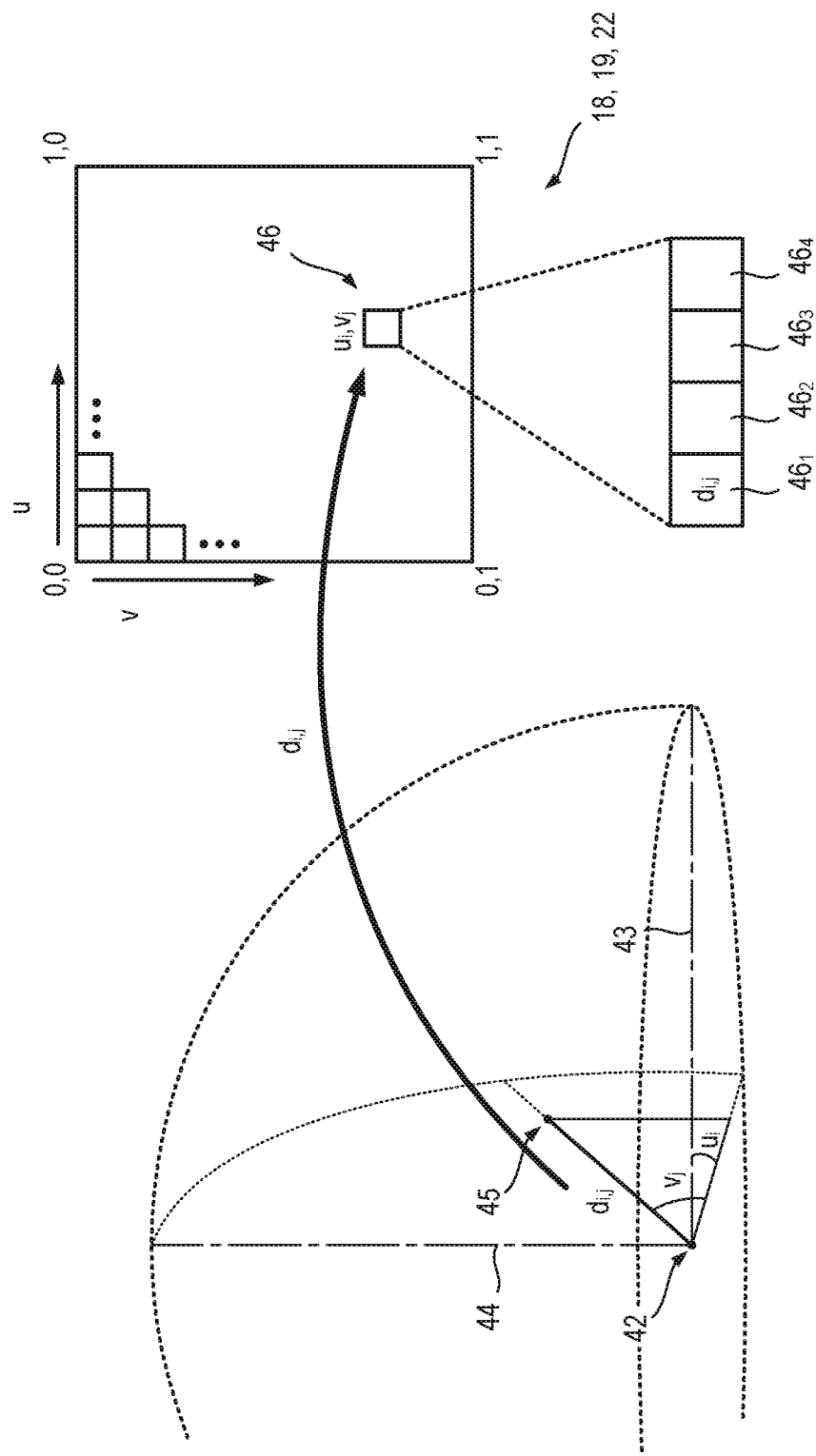
FIG. 4 illustrates generation of a spherical displacement map.

Referring also to FIG. 4, a spherical coordinate system 41 is shown. The spherical coordinate system 41 includes an origin 42 (i.e. a point of reference in the scanner 2) and horizontal and vertical reference axes 43, 44. As shown in FIG. 4, the scanner 2 captures the distance (or "range"), $d_{i,j}$, between the origin 42 and a point 45 on a target surface 4 (FIG. 1).

Scan data 6 for a scan is copied into a texture 22. The texture 22 takes the form of a (u,v) map which includes a two-dimensional array of texture elements (or "texels") 46. Each texel 46 comprising first, second, third and fourth elements $46_1$, $46_2$, $46_3$, $46_4$.

As explained earlier, the texture 22 has four channels. The first channel stores the displacement map 18 and the second, third and fourth channels store the normal map 19.

The horizontal axis, u, of the texture 22 is proportional to the horizontal angle (or "azimuth") of the laser scanner 2. The vertical axis, v, of the texture is proportional to the vertical angle ("elevation") of the laser scanner 2. Each texel 46 stores a value of range for a point in the scan as a depth, $d_{i,j}$, at the azimuth and elevation corresponding to its (u,v) location. Thus, the values of range, when stored in the texture 22, provide a spherical displacement map 18 of the laser scan.

Image data 8 in the form of RGB component values can be copied into a colour map 21 in a similar way.

Referring to FIGS. 1, 2, 3, 5 and 6, the scan data processing module 16 examines the texels 46 to determine whether there are any discontinuities in the displacement map 18 by looking for adjacent texels 46 with a difference in depth, $\Delta d$, which exceeds a specified threshold, $\Delta d_{TH}$, and, if so, marks the discontinuity so that the location will not be tessellated (step S3). The discontinuity is marked by using a predefined number, such as 0 or −1.

The displacement map 18 is spherical and is taken from the point of view of the laser scanner 2. Thus, a discontinuity between adjacent texels 46 in the spherical displacement map 18 represents a region or line 47 where the laser scanner 2 has moved from one surface $48_1$ to another surface $48_2$. Therefore, it is preferable that no surface is drawn in this area.

Figure 5:
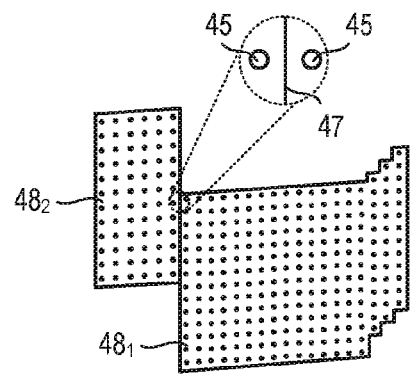
FIG. 5 shows a discontinuity between two surfaces.
Figure 6:
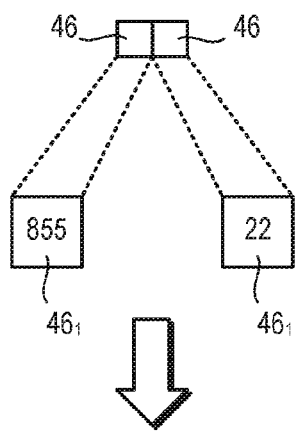
FIG. 6 shows updating a spherical displacement map to mark a discontinuity.
Figure 6:
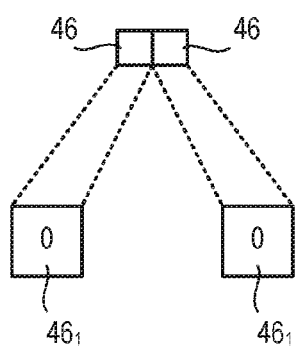
Figure 7:
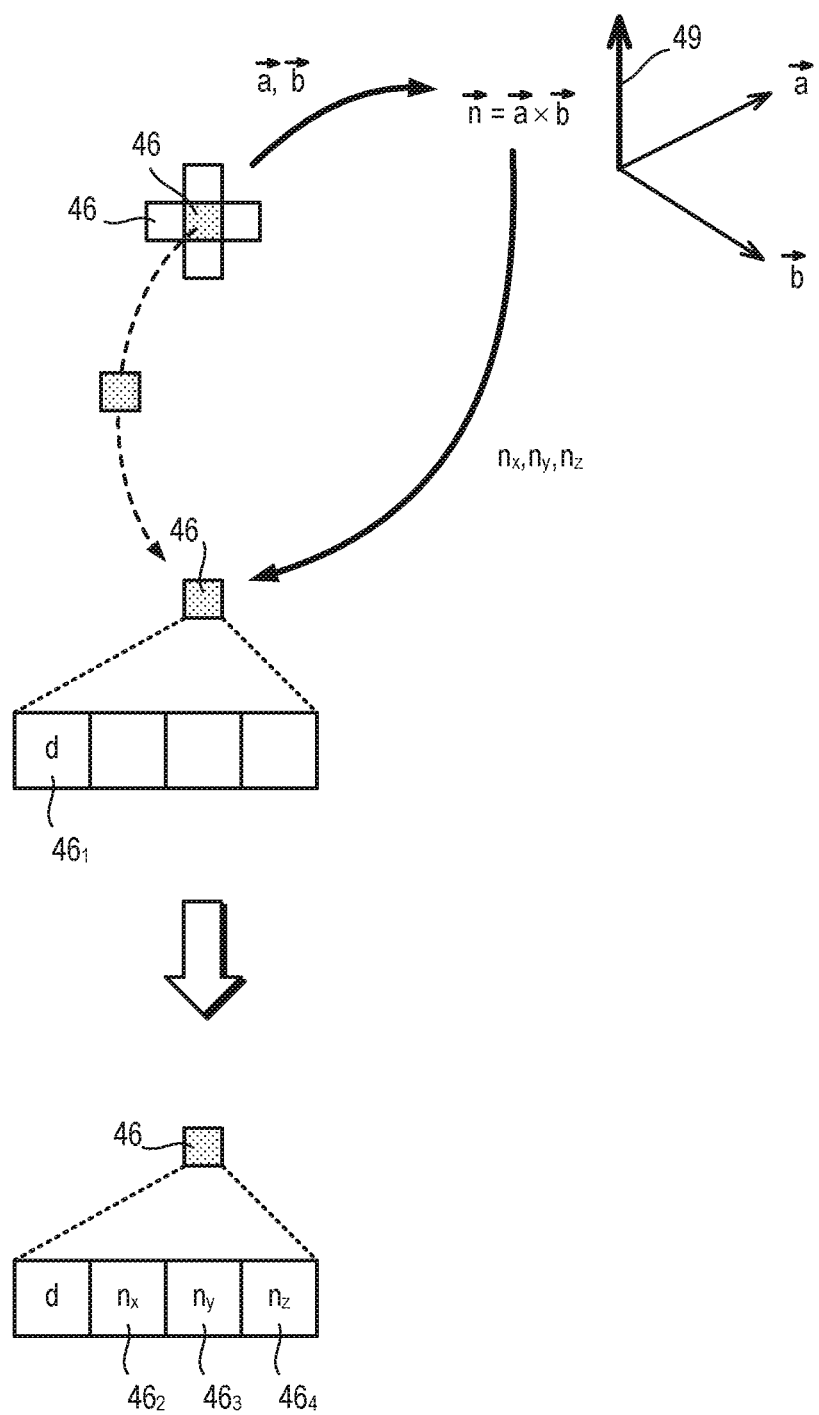
FIG. 7 illustrates generation of a normal map.

For example, as shown in FIG. 5, two adjacent scan points fall on either side of an edge 47. As shown in FIG. 6, the corresponding texels 46 have depth values, for instance 855 and 22 respectively. The threshold, $\Delta d_{TH}$, may be, for instance 300. Thus, the difference in depth $\Delta d=855-22=833$ and $\Delta d > \Delta d_{TH}$ and so the module 16 marks the discontinuity by setting both values equal to zero.

Adjacent texels 46 in u- and/or v-directions can be compared.

Referring to FIGS. 1, 2, 3 and 7, the scan data processing module 16 generates a normal map 19 from the displacement map 18 and stores the normal map 19 (step S4).

For each texel 46 in the displacement map 18, the module 16 calculates the Cartesian coordinates from the spherical coordinates represented by the texel 46. The module calculates a normal 49 for a given texel 46 (which is shown shaded in FIG. 7) by taking the cross product of a first vector between horizontal neighbouring texels 46 and a second vector between vertical neighbouring texels 46 which are adjacent to the texel 46, in Cartesian coordinates. The module 16 does not calculate a normal 49 across a discontinuity.

The module 16 stores the x-, y- and z-components ($n_x$, $n_y$, $n_z$) of the normal 49 in the texel 46 in the second, third and fourth elements $46_2$, $46_3$, $46_4$.

Referring to FIGS. 1, 2, 3 and 8, the scan data processing module 16 can, optionally, generate a blending texture 20 that contains information used to smooth the edge of a surface near a discontinuity (step S5).

Each texel 50 in the blending texture 20 contains a blending value, s, which lies in a range between 0 and 1.

Figure 8:
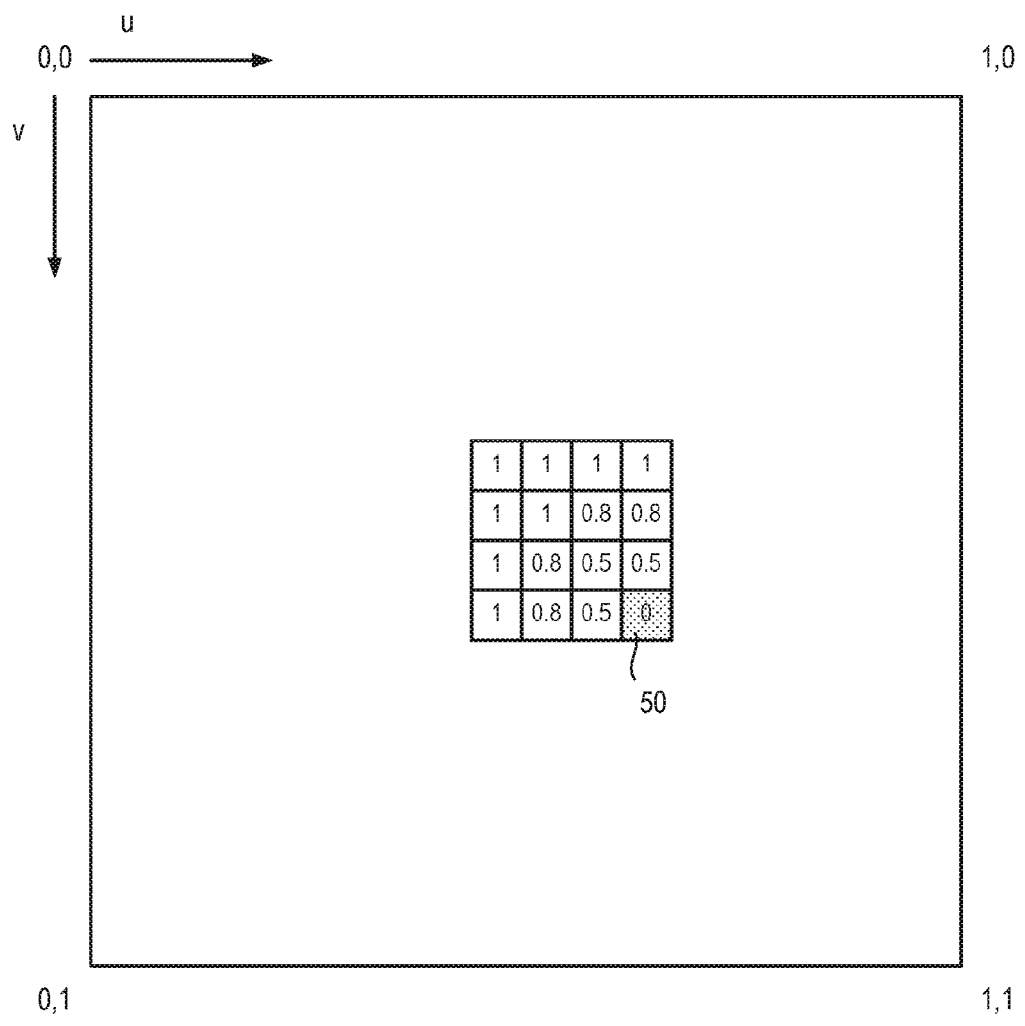
FIG. 8 shows generation of a blending map.

The scan data processing module 16 identifies texels 46 in the displacement map 18 which correspond to points along the discontinuity and sets corresponding texels 50 in the blending texture 20 (i.e. having the same values of u and v) to have a blending value of 0. The scan data processing module 16 generates further blending values which gradually propagate through the blending texture 20, i.e. values which gradually increase. For example, as shown in FIG. 8, a value of 0.5 is given to a texel 50 which is a first-nearest neighbour to a discontinuity, a value of 0.8 is given to a texel 50 which is a second-nearest neighbour and a value of 1 is given to a texel 50 which is a third-nearest neighbour.

Referring to FIGS. 1, 2, 3 and 9, the scan data processing module 16 breaks a scan into patches 51 and stores a patch map 23 (step S6).

Each patch 51 defines a region of the scan textures in (u,v) coordinates. Each patch has a set of vertices 52.

The patches 51 can be any shape and can be regularly or irregularly distributed in the scan. The shape and position of the patches 51 can be predetermined or based on any aspect of the scan, such as locations of discontinuities or variance of normals.

Figure 9:
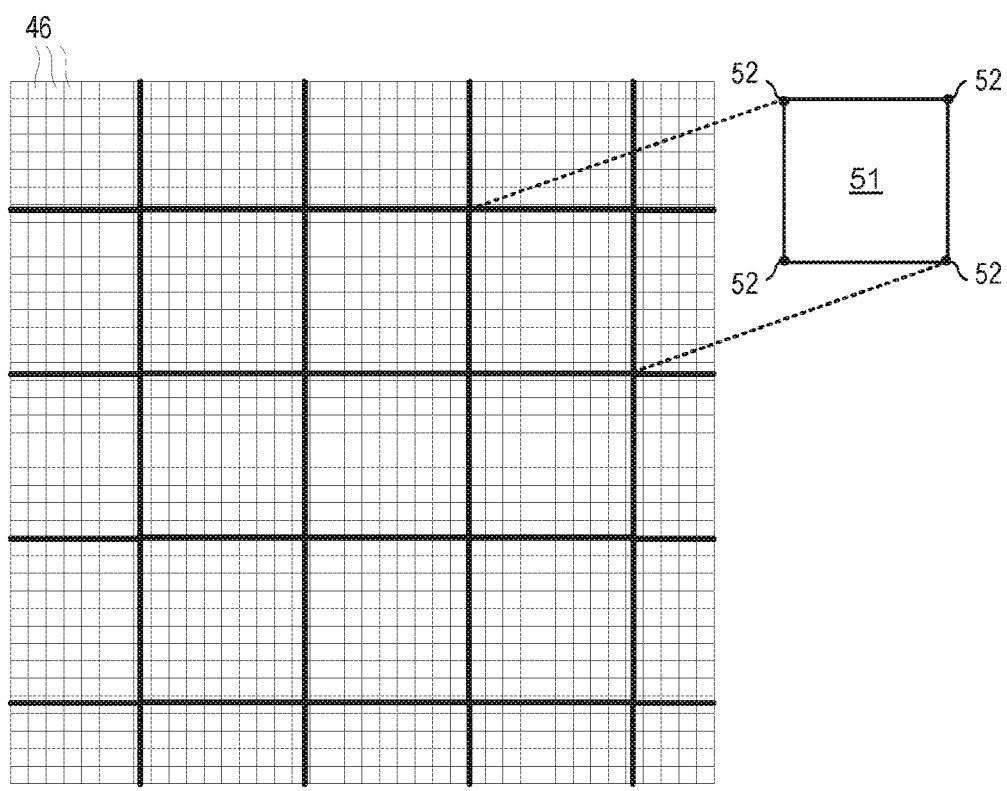
FIG. 9 illustrates an arrangement of regular, rectangular patches.

For example, FIG. 9 shows an arrangement of rectangular patches 51 which are all the same shape and size.

Figure 10:
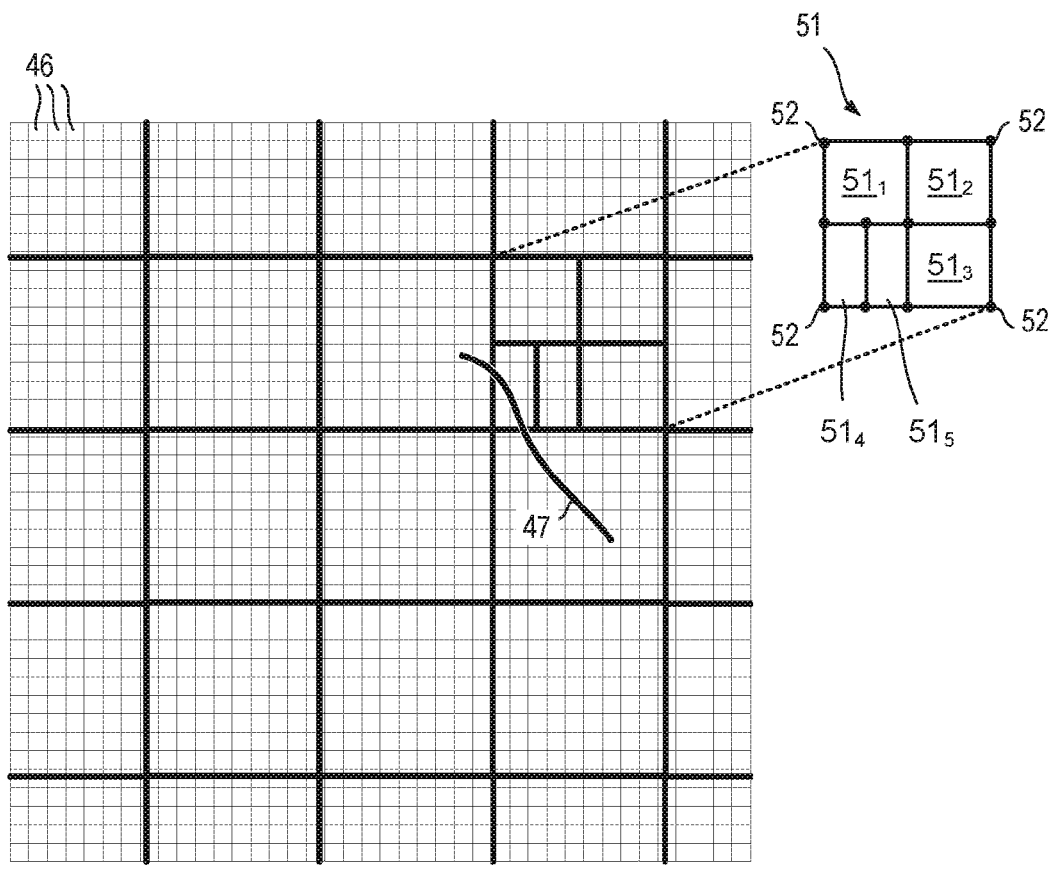
FIG. 10 illustrates an arrangement of irregular, rectangular patches.

In another example, FIG. 10 shows an arrangement of rectangular patches 51 of different sizes which take into account the location of discontinuities 47. For example, as shown in FIG. 10, instead of using fixed-sized patches 51, the scan data processing module 16 may break a larger patch 51 into smaller patches $51_1$, $51_2$, $51_3$, $51_4$, $51_5$ according to whether a discontinuity is found within the patch 51.

Figure 11:
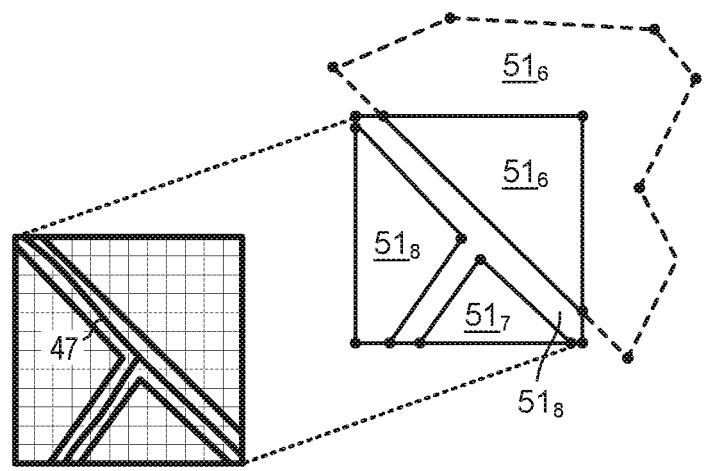
FIG. 11 illustrates an arrangement of irregular, non-rectangular patches.

In yet another example, FIG. 11 shows an arrangement in which the scan data processing module 16 generates non-rectangular patches $51_6$, $51_7$, $51_8$, $51_9$ having edges which take into account (for example, are aligned with) a forking discontinuity 47. For clarity, the outer edges of the patches $51_6$, $51_7$, $51_8$, $51_9$ are shown truncated so that they appear as straight vertical or horizontal edges. However, it will be appreciated that the patches need not be truncated and can have an irregular outline, for example, as shown in chain for patch $51_6$ in FIG. 11.

Figure 12:
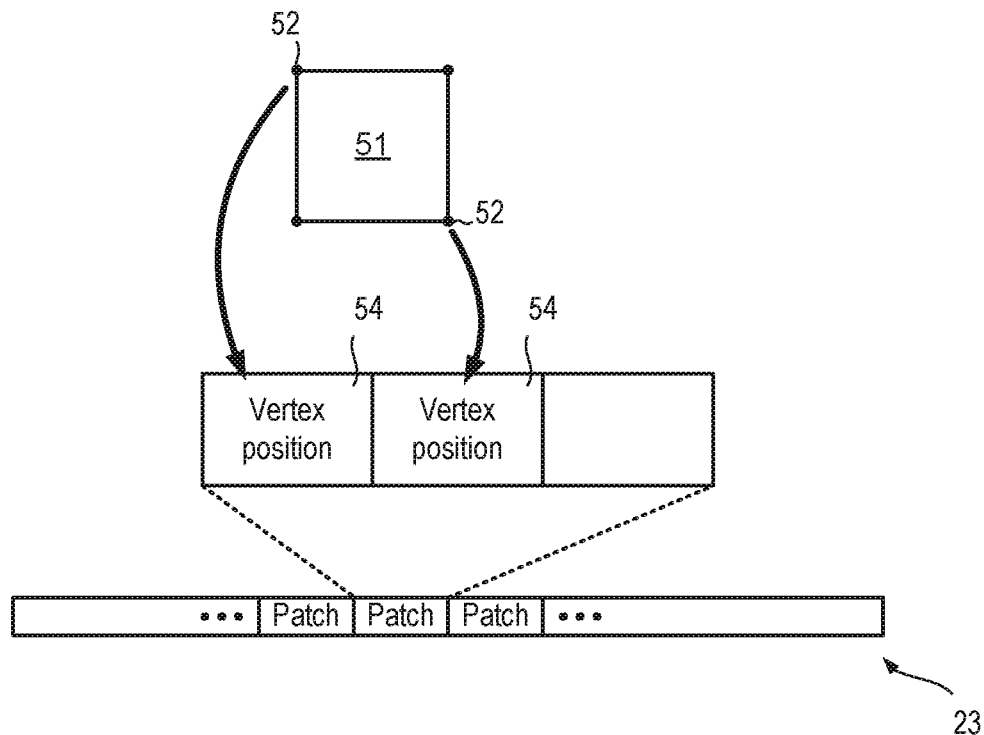
FIG. 12 shows a patch map.
Figure 13:
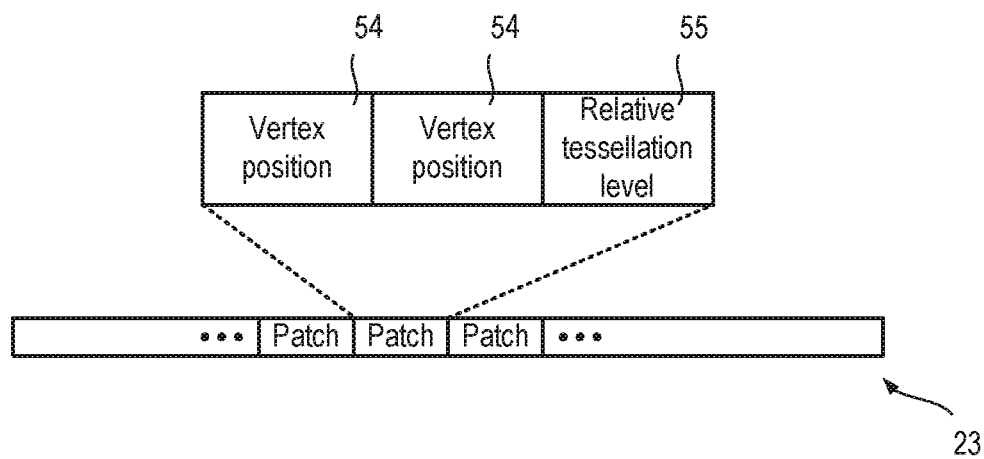
FIG. 13 shows adding relative tessellation data to a patch map.

Referring also to FIG. 12, for each patch 51, a set of elements 54 are stored in the patch map 23 for each patch 51, each element 54 comprising the position of a patch vertex 52. In the case of rectangular patch 51 (such as that shown in FIG. 9), the patch 51 can be specified using only two vertices 52, for example, upper left and lower right vertices 52. However, there may be more than two elements 54, particularly for irregularly-shaped patches.

Referring to FIGS. 1, 2, 3 and 13, the module 16 calculates a relative tessellation level 55 for each patch 51 (step S7).

The relative tessellation level 55 represents how much a patch 51 will be tessellated relative to the other patches 51. An absolute tessellation level is calculated later, after view-dependent factors or other factors are applied. The relative tessellation level 55 can be predetermined or based on any aspect of the patch such as the location of discontinuities or the variance of normals.

The displacement map 18, the normal map 19, the blending texture 20 and the patch map 23 can be produced once for each scan and stored for later use.

Rendering

Figure 14:
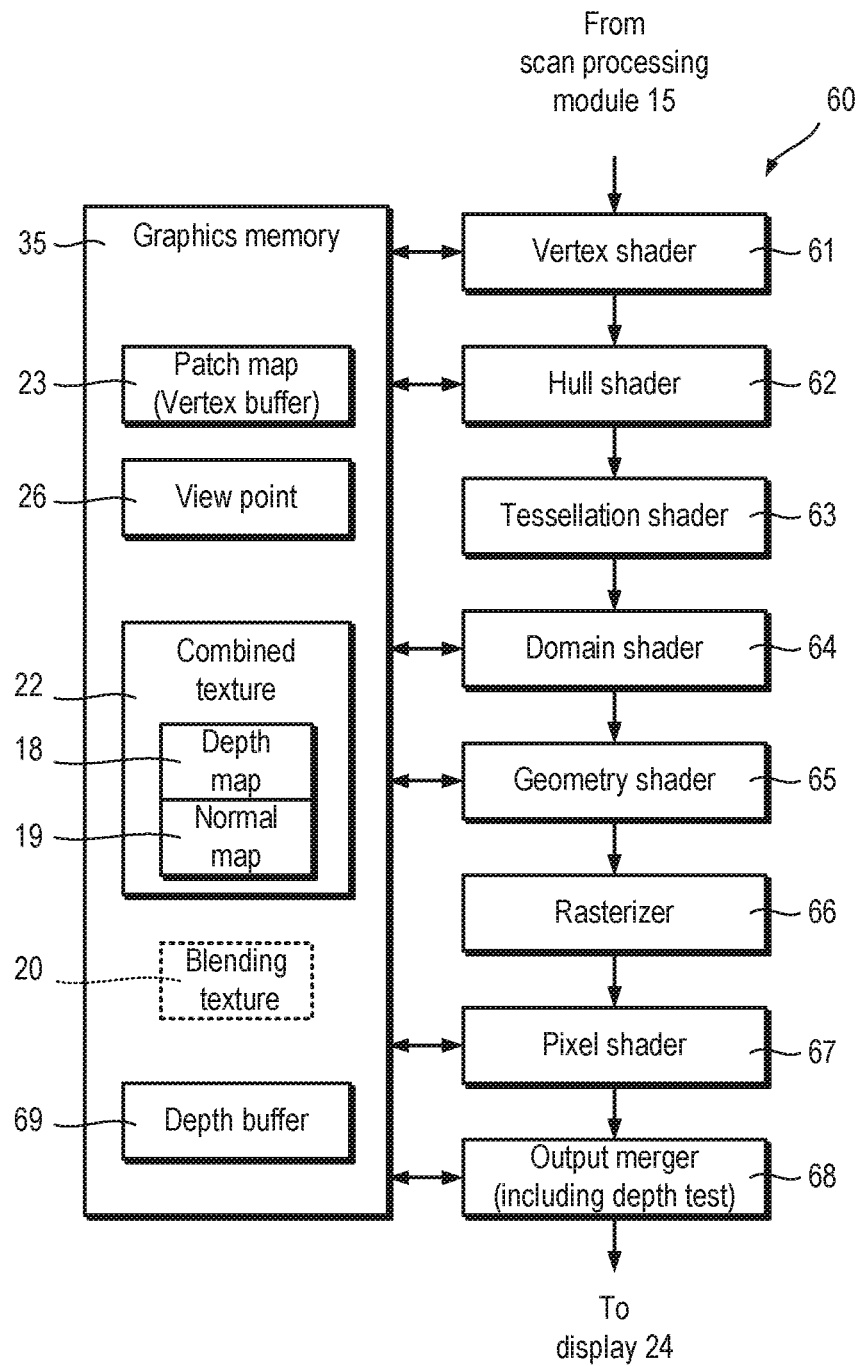
FIG. 14 is a schematic block diagram of a graphics pipeline and graphics memory.

Referring to FIGS. 1, 2 and 14, the scan data processing module 16 loads the textures 18, 19, 20 and the patch map 23 for each scan into the rendering system 26. The rendering system 26 is used to produce tessellated surface(s) of the scan using information in the patch map 23. Any rendering system that supports tessellation can be used. Preferably, a rendering system which can process 100 million triangles per second or at a higher rate is used. The rendering system can run on a CPU or GPU.

The rendering system 26 employs Microsoft® DirectX 11® running on the GPU 34. However, other graphics systems, such as OpenGL 4.x, can be used.

The textures 18, 19, 20 and patch map 23 are stored in a form which can be efficiently processing by the rendering system 26.

The textures 18, 19, 20 are stored as two-dimensional texture resources and the patch map 23 is stored as a vertex buffer with a topology of a one-control-point patch list. As explained earlier, the displacement and normal maps 18, 19 are combined into a combined texture 22 with four channels.

The textures 18, 19, 20 and the vertex buffer 23, i.e. patch map 23, are sent to the GPU 34.

Referring to FIG. 14, a graphics pipeline 60 for the graphics system is shown.

The graphics pipeline 60 includes a vertex shader 61, a hull shader 62, a tessellation shader 63 (herein also referred to simply as a "tessellator"), a domain shader 64, a geometry shader 65, a rasterizer 66, a pixel shader 67 and an output merger stage 68 which, among other things, carries out a depth test in conjunction with a depth buffer 69 (also referred to as a "z-buffer").

In OpenGL, a hull shader is referred to as a "tessellation control shader", a tessellation shader is referred to as a "primitive generator", a domain shader is referred to as a "tessellation evaluation shader" and pixel shader is referred to as a "fragment shader".

Figure 15:
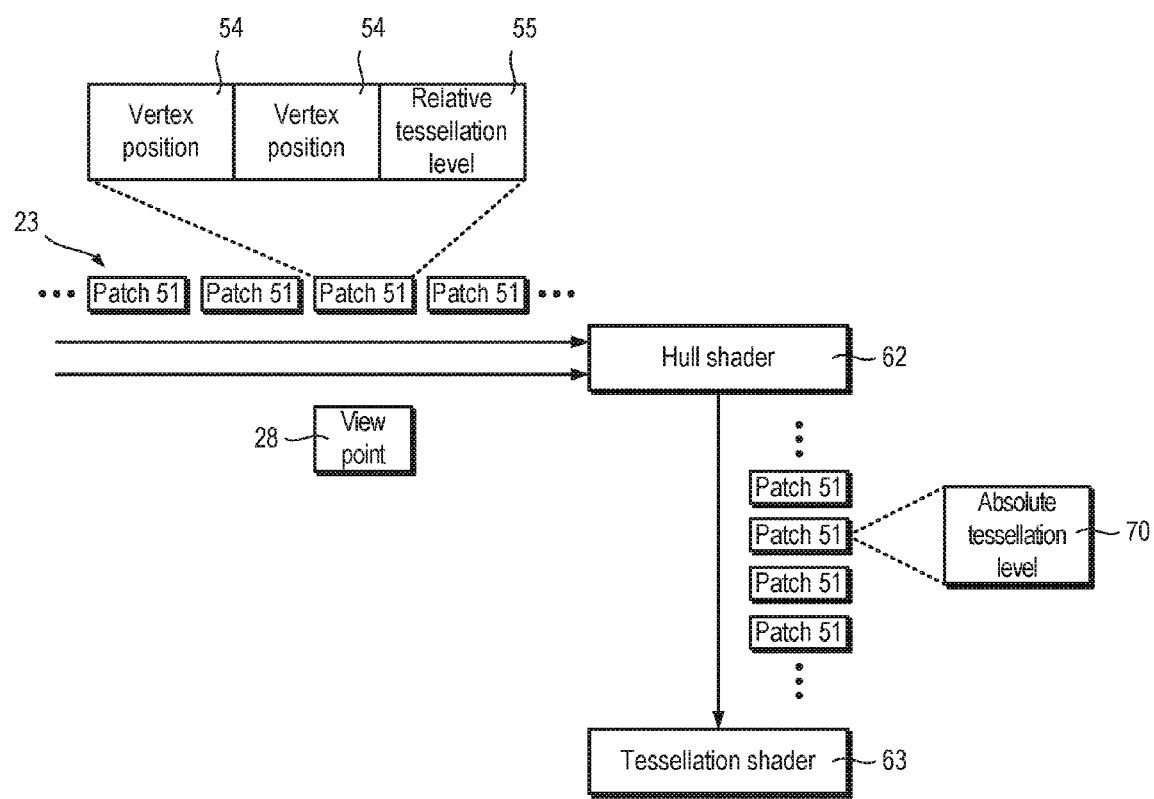
FIG. 15 illustrates output of a hull shader.

Referring to FIGS. 14 and 15, each patch 51 in the vertex buffer 23 is processed by the hull shader 62. The hull shader 62 calculates an absolute tessellation level 70 for each patch 51. The tessellation level 70 can be predetermined or based one or more factors, such as distance of the patch 51 from the view point 29 or its visibility. The relative tessellation level 55 of the patch 51 may be taken into account.

In this example, the absolute tessellation level 70 for each patch 51 is calculated based on the view point 28 and the relative tessellation level 55. The hull shader 62 also adjusts the tessellation level around the edges of a patch 51 so that it matches the tessellation level of the neighbouring patches 51. This produces continuous tessellation across patches 51.

Figure 16:
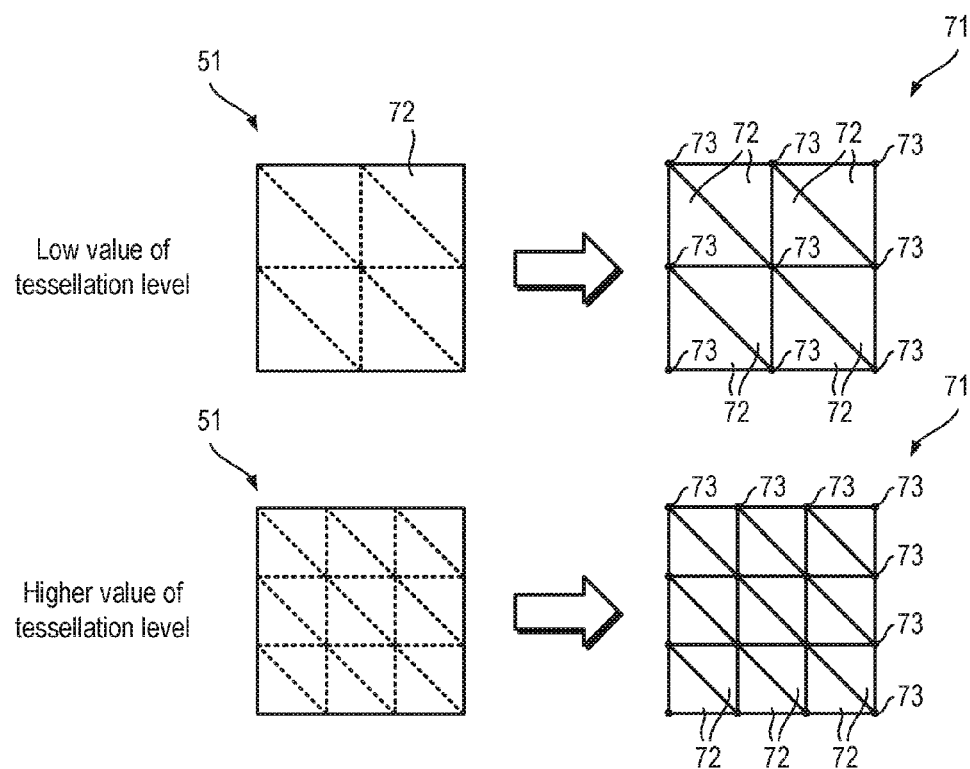
FIG. 16 illustrates tessellation levels for a patch.
Figure 17:
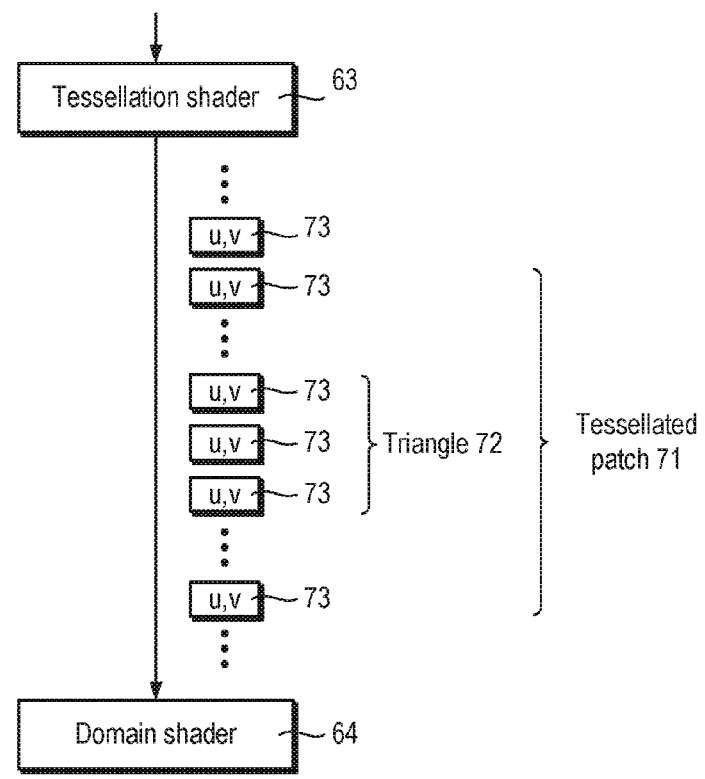
FIG. 17 illustrates output of a tessellation shader and input of a domain shader.

Referring also to FIGS. 16 and 17, the tessellation shader 63 is a fixed-function module that produces a respective tessellation pattern 71 for each patch 51.

The tessellation shader 63 generates a tessellation pattern 71 (herein referred to as a "tessellated patch") based on the absolute tessellation level 70 calculated by the hull shader 62. The tessellation pattern 71 is made up of triangles 72. Points 73 in the tessellation pattern 71 contain their (u,v) coordinates within the combined texture 22.

As shown in FIG. 17, the tessellation shader 63 outputs the tessellation pattern 71 in the form of a point list listing coordinates of the points 73 of the triangles 72 making up each patch 51. Each (u,v) point 73 is sent, one-at-a-time, to the domain shader 64.

Figure 18:
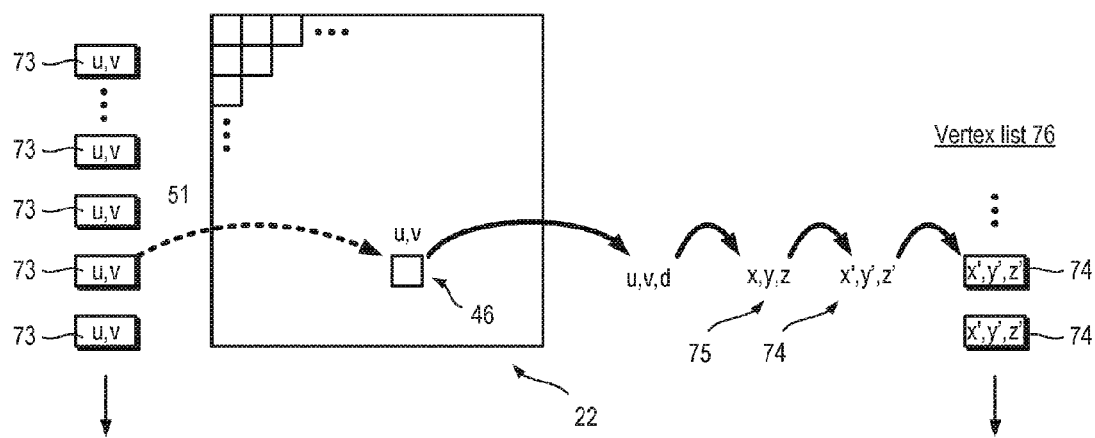
FIG. 18 illustrates operation of a domain shader using a texture which includes a displacement map and a normal map.
Figure 19:
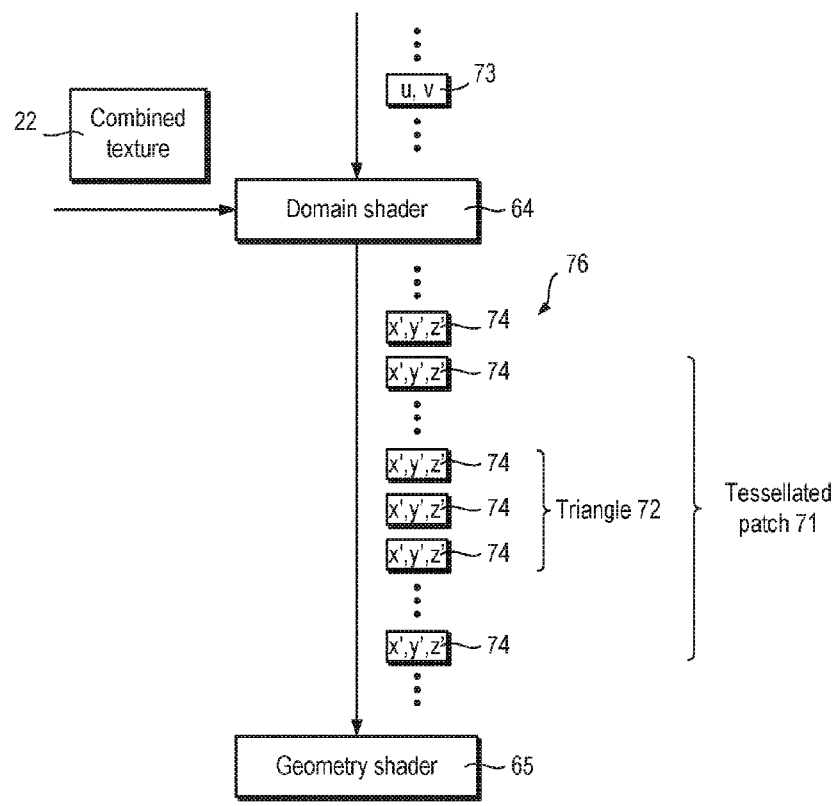
FIG. 19 illustrates output of a vertex list from a domain shader.

Referring also to FIGS. 18 and 19, each point 73 in each patch 51 is processed by the domain shader 64. The domain shader 64 samples the combined depth/normal texture 22 and projects tessellated points into three-dimensional space.

The domain shader 64 calculates the position of each point 73 in the tessellation pattern 71 in a patch 51. The domain shader 64 samples the combined depth/normal texture 22 at the (u, v) coordinate of the point 73 to retrieves values of depth and normal. If the sample includes a texel 46 that is next to a discontinuity, the point is marked invalid.

The domain shader 64 calculates the azimuth and elevation from the (u, v) coordinate using information in the patch 51. The domain shader 64 then converts the spherical coordinates (i.e. azimuth, elevation, depth) into view coordinates 74 either directly or (as shown in FIG. 18) in stages, namely converting the spherical coordinates into the Cartesian position 75 in the coordinate system of the scan and then transforms the position and normal into world coordinates and then into view coordinates 74. The coordinates 74 are output in the form of a vertex list 76.

The domain shader 64 effectively displaces points on a spherical surface by the depth specified in the (spherical) displacement map 19.

Figure 20:
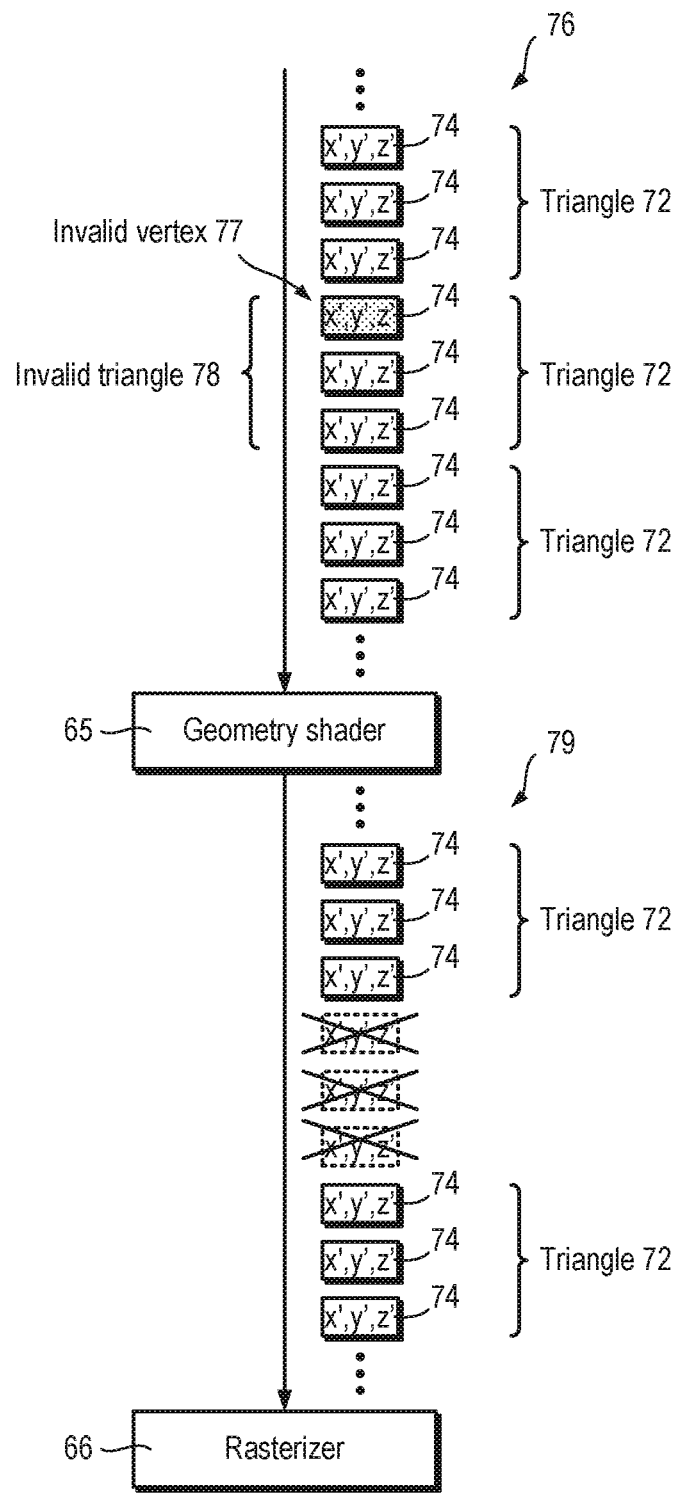
FIG. 20 shows operation of a geometry shader which culls invalid triangles.

Referring to FIG. 20, each triangle 72 in a tessellated patch 71 is then processed by the geometry shader 65. The geometry shader 65 culls triangles 72 at discontinuities.

The geometry shader 65 determines if a triangle 72 contains any invalid vertices 77. A vertex 74 is invalid if it is next to a discontinuity. If an invalid vertex 77 is present, then the geometry shader 65 discards the triangle 72, i.e. discards the invalid triangle 78. The geometry shader 65 also determines if the triangle 72 is at an angle which is too oblique to the laser scanner position. If so, the triangle 72 is also discarded. The geometry shader 65 outputs an updated vertex list 79.

Figure 21:
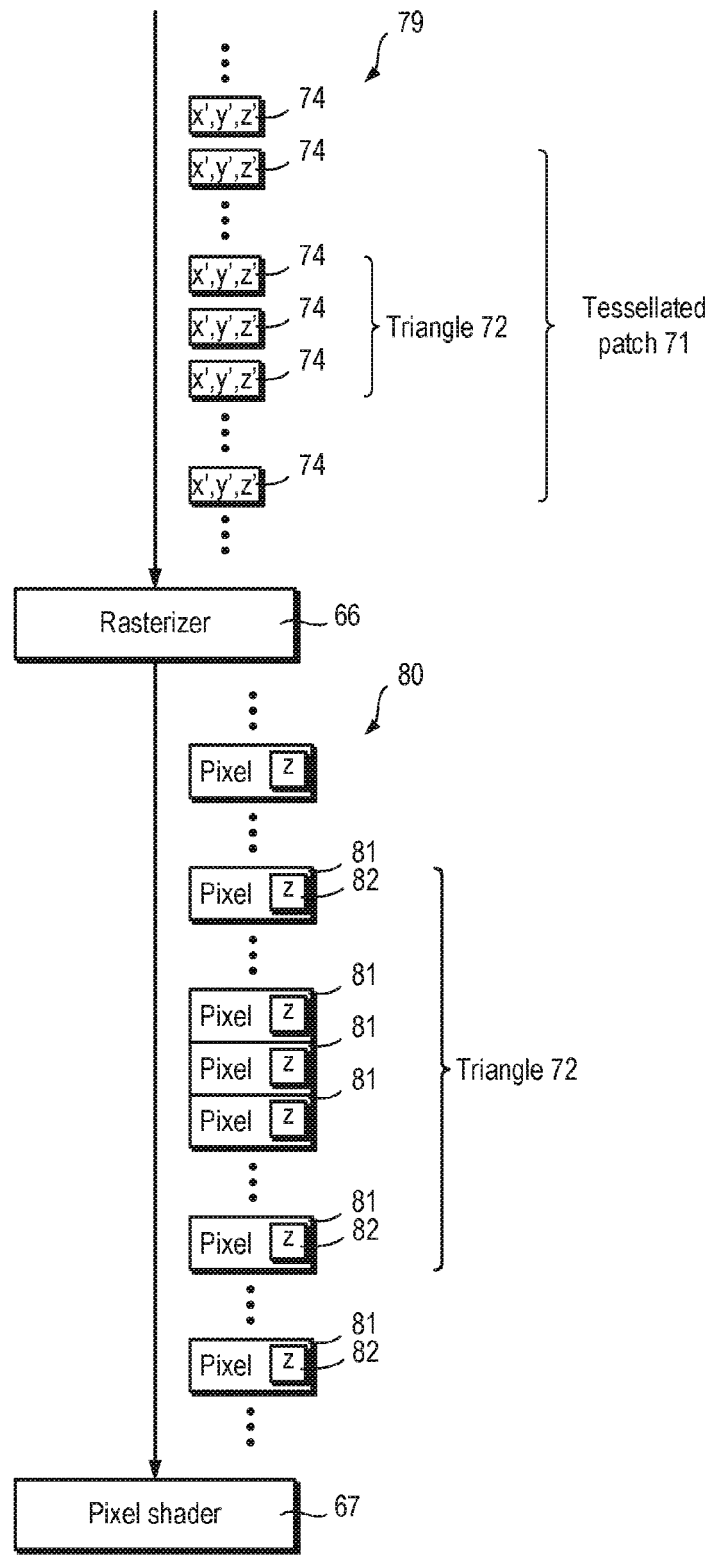
FIG. 21 illustrates operation of a rasterizer.

Referring to FIG. 21, the rasterizer 66 converts each triangle 72 in the updated vertex list 79 into raster data 80 comprising pixels 81. Each pixel 81 includes a value of depth 82.

Each rasterized triangle 72 is then processed by the pixel shader 67.

Figure 22:
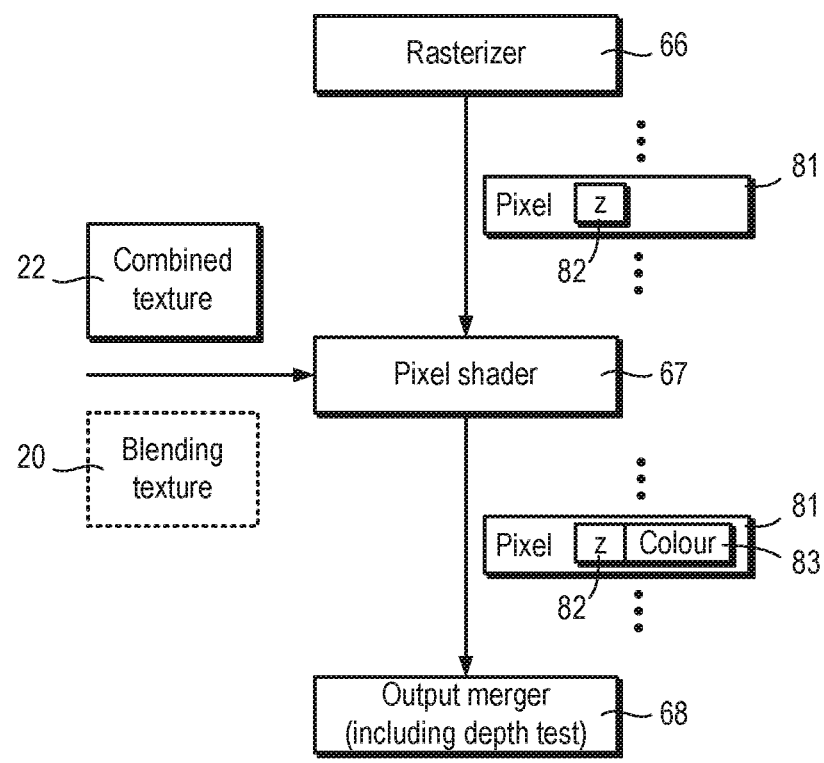
FIG. 22 illustrates operation of a pixel shader.

Referring to FIG. 22, the pixel shader 67 samples the blending texture 20 to determine if a pixel 81 is too close to a discontinuity 47 (FIG. 5). If the pixel 81 is too close to a discontinuity, then it is discarded. The pixel shader 67 samples the combined depth/normal texture 22 to retrieve the normal 49 (FIG. 7) at the pixel 81. The pixel shader 67 transforms the normal 49 (FIG. 7) into a vector (not shown) in world space. The pixel shader 67 calculates a colour 83 of a pixel 81 and outputs raster data 84 for including the depth 82 and colour 83 for each pixel 81.

Figure 23:
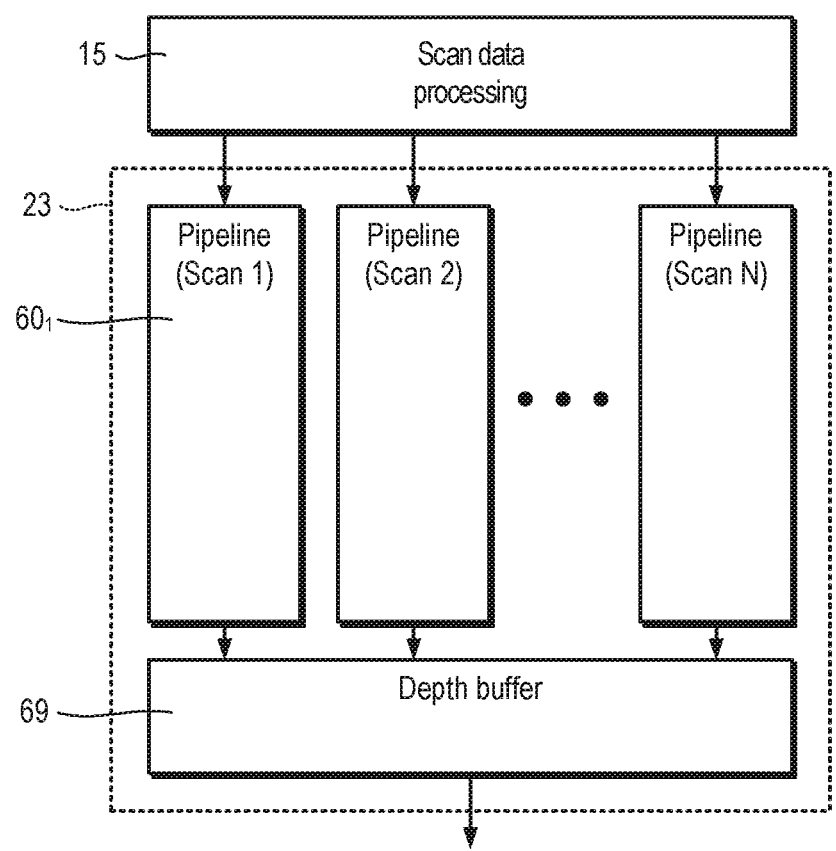
FIG. 23 is process flow diagram of a depth test.

Referring to FIGS. 14 and 23, when multiple scans are rendered into one image, scan data can be combined using the depth buffer 69.

The pixel shader 67 can measure quality of the depth by sampling, at a given location and offset, the depth 82. The pixel shader 67 can favour higher-quality samples at the same screen coordinate. The pixel shader 67 can use information in the blending texture 20 and/or the combined depth/normal texture 22 to determine the quality of the sample.

The output merger stage 68 performs, among other things, a depth test.

Figure 24:
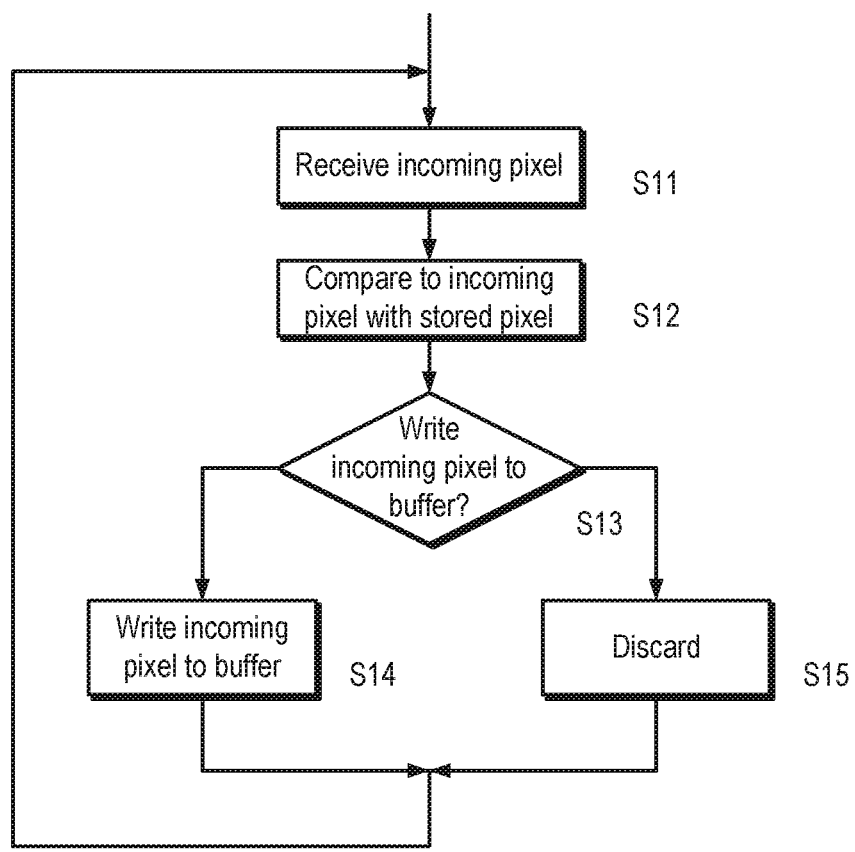
FIG. 24 illustrates parallel processing of scans.

Referring also to FIG. 24, each pixel 81 is compared to a corresponding pixel in the depth buffer 69 (steps S11, S12 & S13). If the incoming pixel 81 has a lower value of depth than the corresponding pixel stored in the depth buffer 69, then the incoming pixel 81 is written into the buffer 69 (step S14). If the incoming pixel 81 has a higher value of depth than the corresponding pixel stored in the depth buffer 69, then the incoming pixel 81 is discarded (step S15).

Pixel data generated from several scans can be written to the same depth buffer 69 and, thus, an image comprising data from several scans can be formed.

Referring to FIGS. 25 to 28, the method of processing laser scan data and rendering an image is illustrated for a set of scans at different stages during the process.

Figure 25:
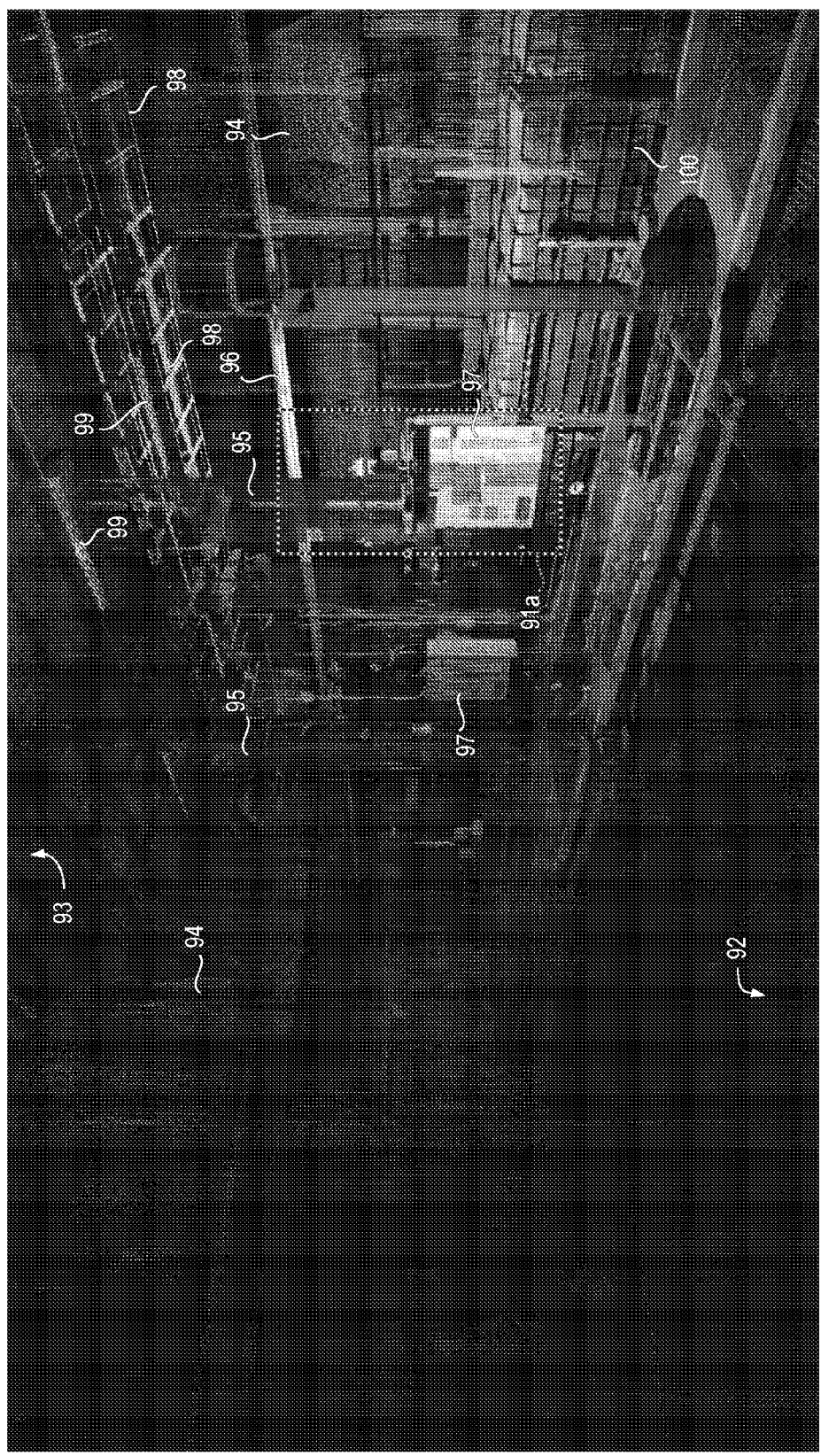
FIG. 25 illustrates a combined point cloud generated from multiple scans.
Figure 25A:
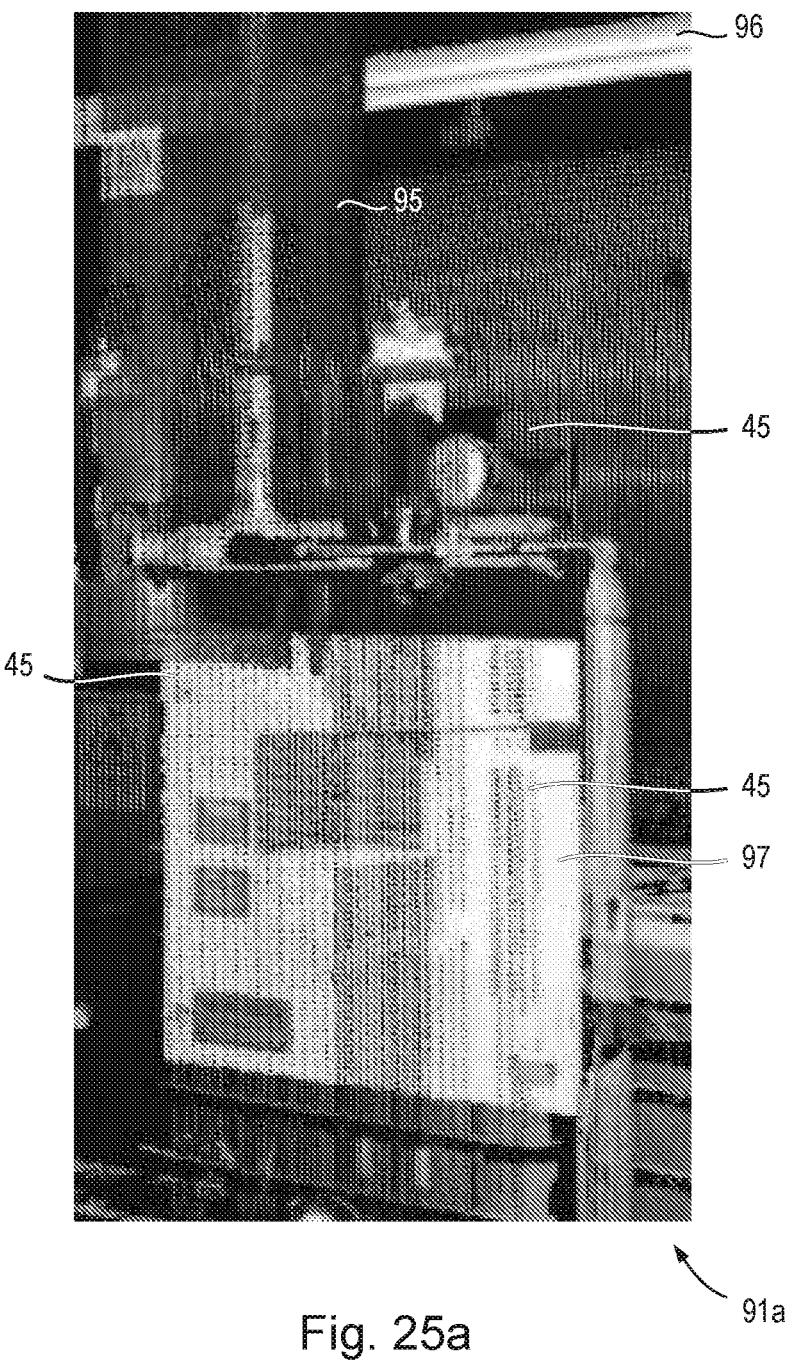
FIG. 25a is a magnified view of part of the point cloud shown in FIG. 25.

FIG. 25 is an image 91 of point cloud generated from multiple scans. FIG. 25a is a magnified view of part 91a of the image 91 shown in FIG. 25.

The image 91 shows the interior of a process plant which includes, among other things, a floor 92, a ceiling 93, storage tanks 94, a row of three reaction vessels 95, various pipes 96, a row of four control panels 97, cable trays 98 suspended from the ceiling 93, lighting units 99 (or "luminaries") and a row of four pallet-type liquid storage containers 100.

FIG. 25a is a more detailed view of a middle reaction vessel 95, pipes 96 and a corresponding control panel 97. The image 91, 91a is formed from point cloud points 45. In this case, each point 45 has a respective colour captured at time of scanning.

As shown in FIG. 25a, relatively distant objects, such as the control panel 97, are visible even though relatively near objects, such as the reaction vessel 95, is in front of it and so should obscure the distant object. This effect becomes more pronounced when the image is magnified.

Figure 26:
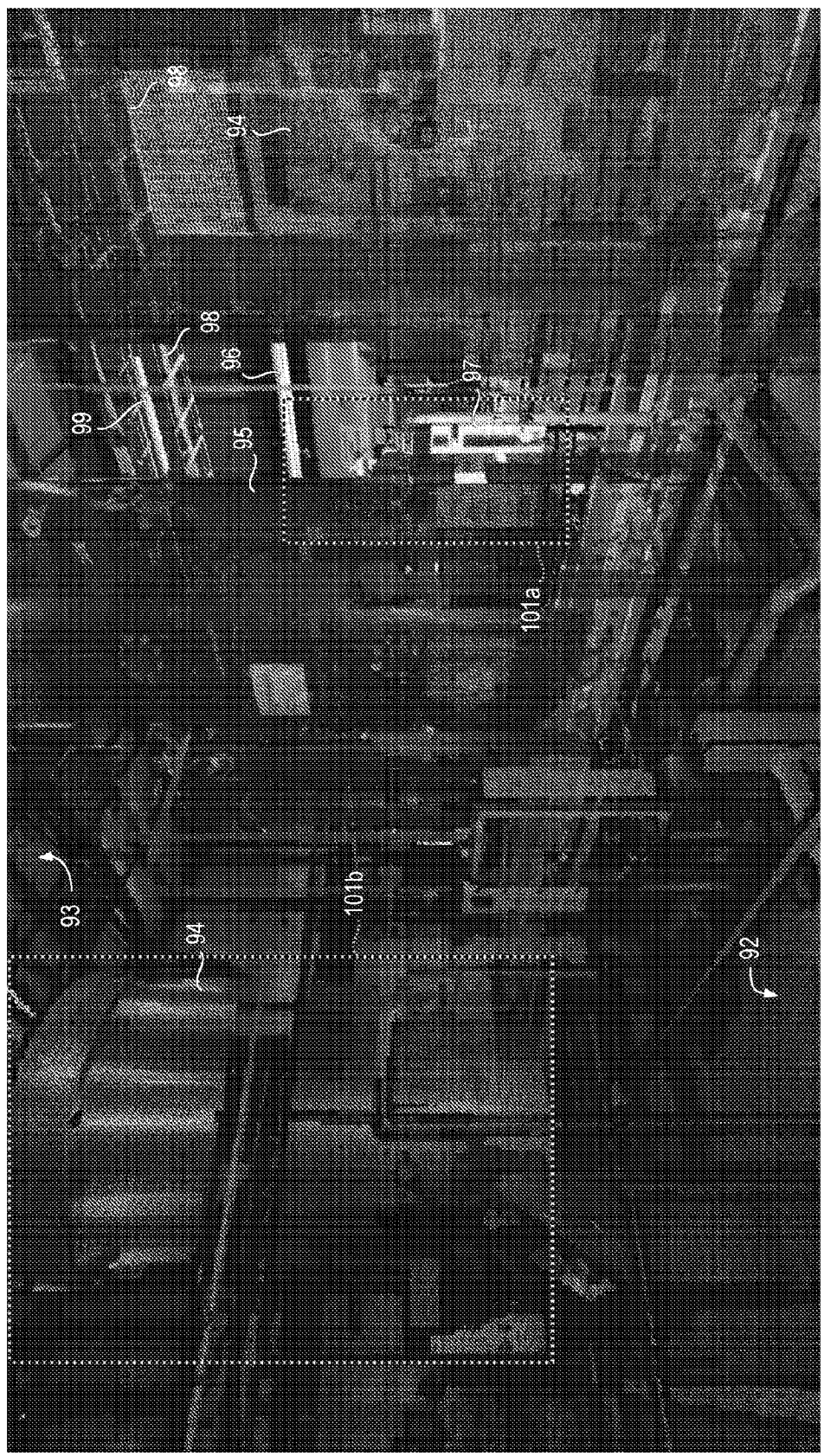
FIG. 26 shows a combined tessellated image generated from individual scans of the point cloud shown in FIG. 25.
Figure 26A:
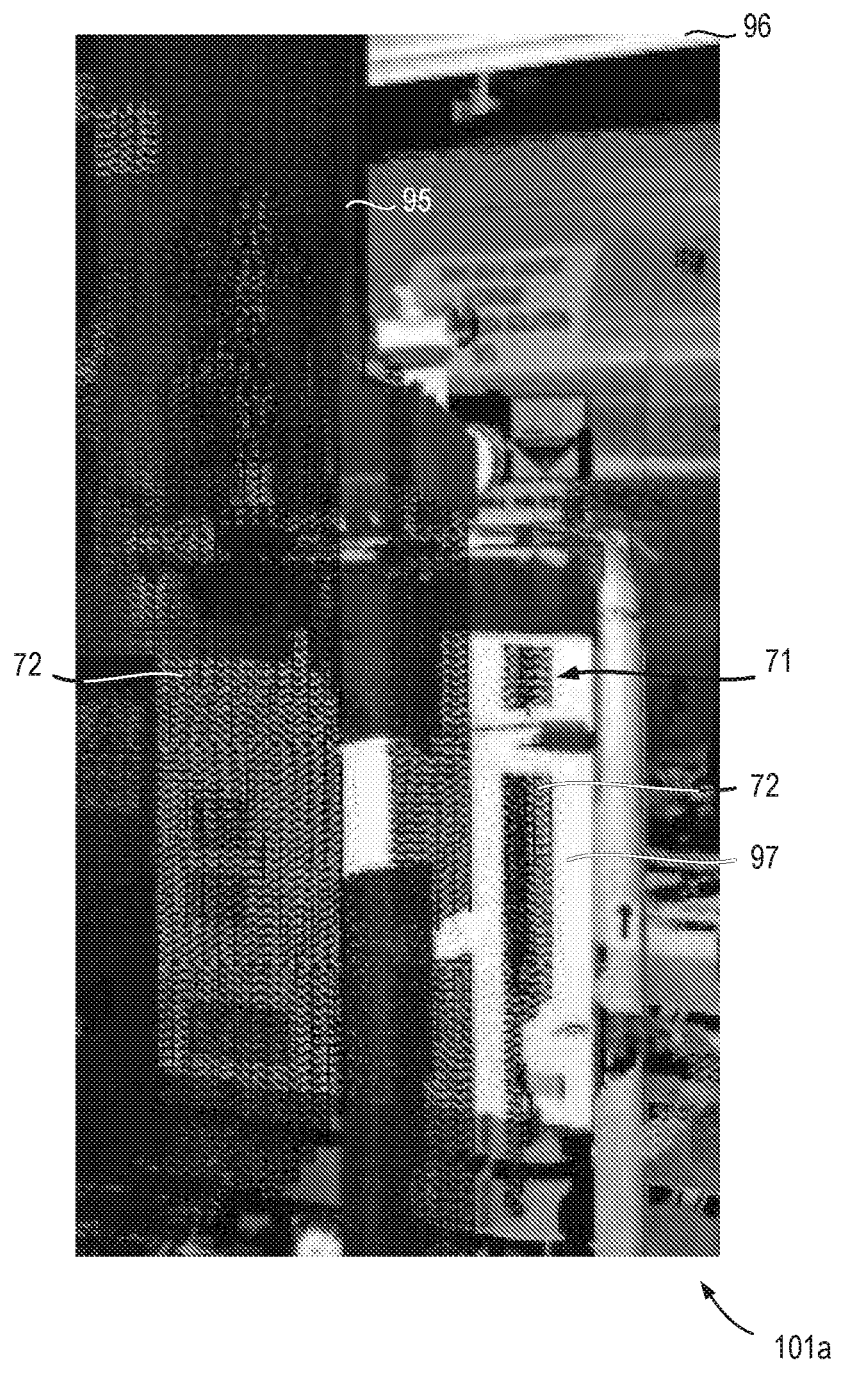
FIG. 26a is a magnified view of part of the tessellated image shown in FIG. 26.
Figure 26B:
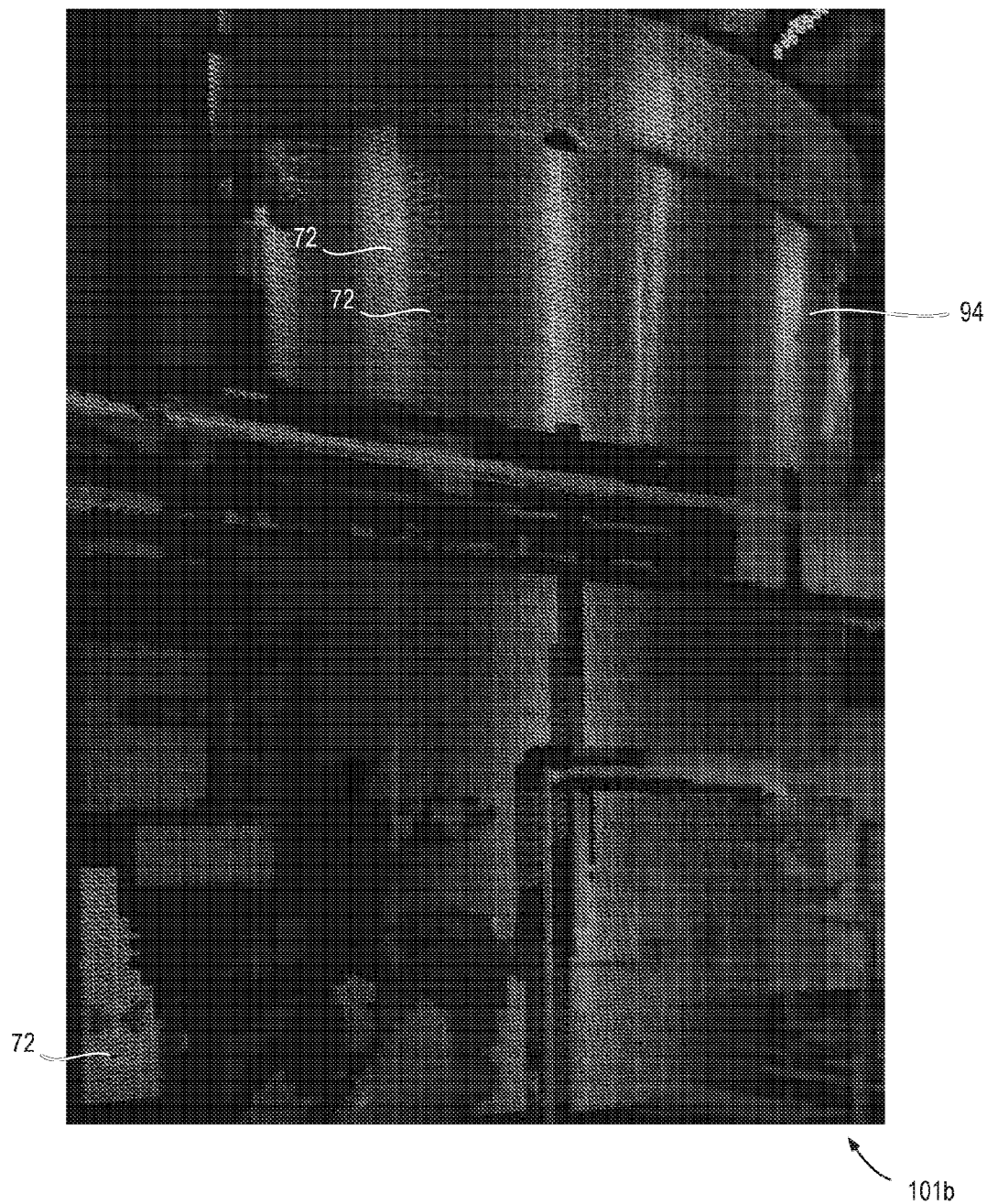
FIG. 26b is a magnified view of another part of the tessellated image shown in FIG. 26.

FIG. 26 shows a combined tessellated image 101 generated from the individual scans of the point cloud shown in FIG. 25. FIGS. 26a and 26b are magnified view of parts 111a, 111b of the image 111 shown in FIG. 26.

Referring to FIGS. 25a and 26b, points 45 from the point cloud are used to form tessellation patterns 71 made up of triangles 72.

FIG. 26b shows triangles 72 having different sizes, in other words, have different tessellation levels.

Objects which should be hidden, such as the reaction vessels 95, are still transparent since the triangles 72 have not been rasterized and, thus, filled in.

Figure 27:
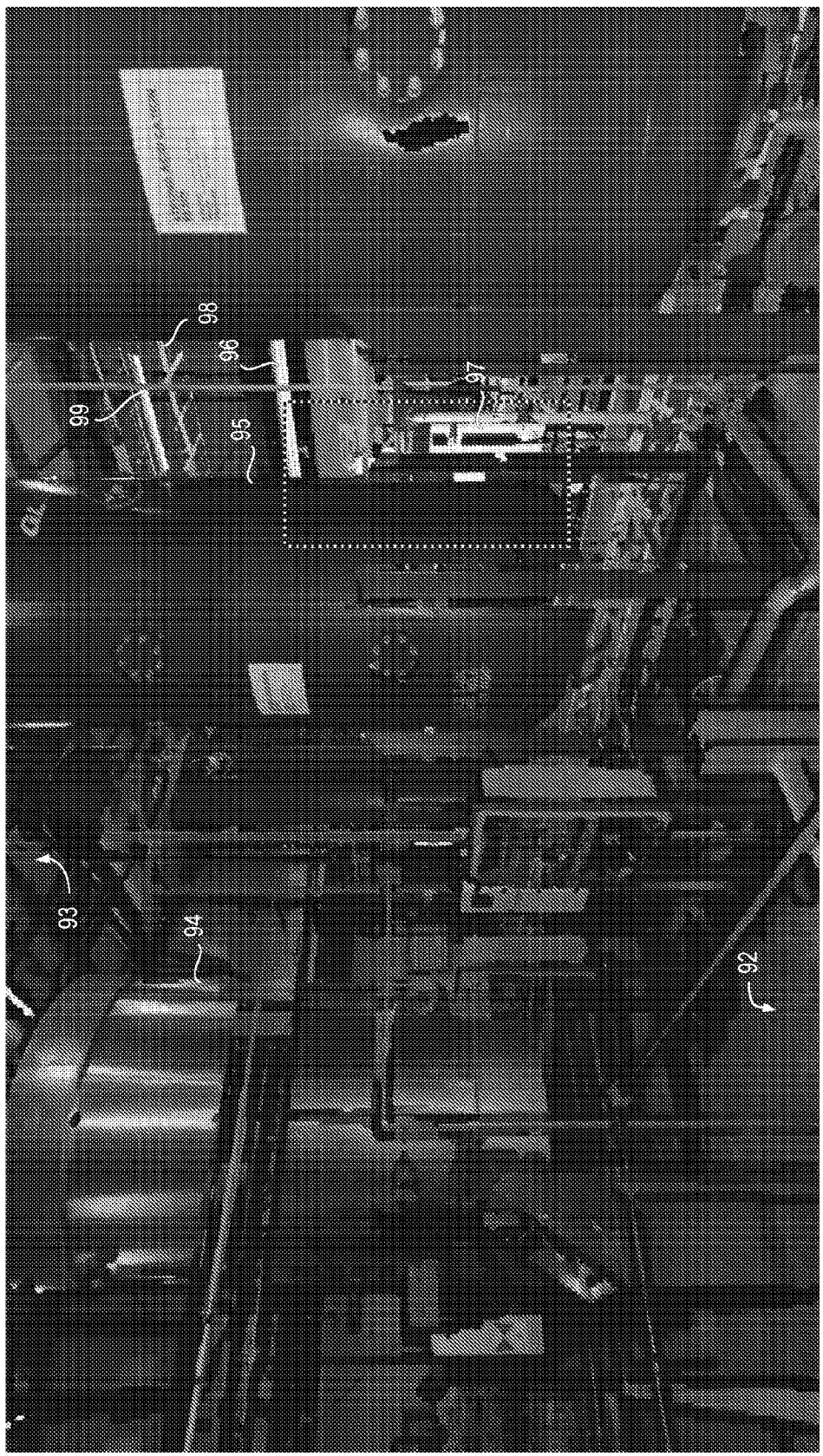
FIG. 27 shows a combined rendered image generated using the tessellation shown in FIG. 26.

FIG. 27 shows a combined rendered image 28, 111 generated using tessellation.

As shown in FIG. 27, relatively distant objects, such as control panels 97, are now obscured by relatively near objects, such as reaction vessels 95.

As explained earlier, the rendering system 26 (FIG. 1) can render images in real time using multiple scans. Furthermore, the system 26 (FIG. 1) allows position to be changed and generate tessellated images viewed from different positions. Position can be incrementally or continuously changed allowing the user to "walk" or "fly" through the surveyed environment.

Figure 28:
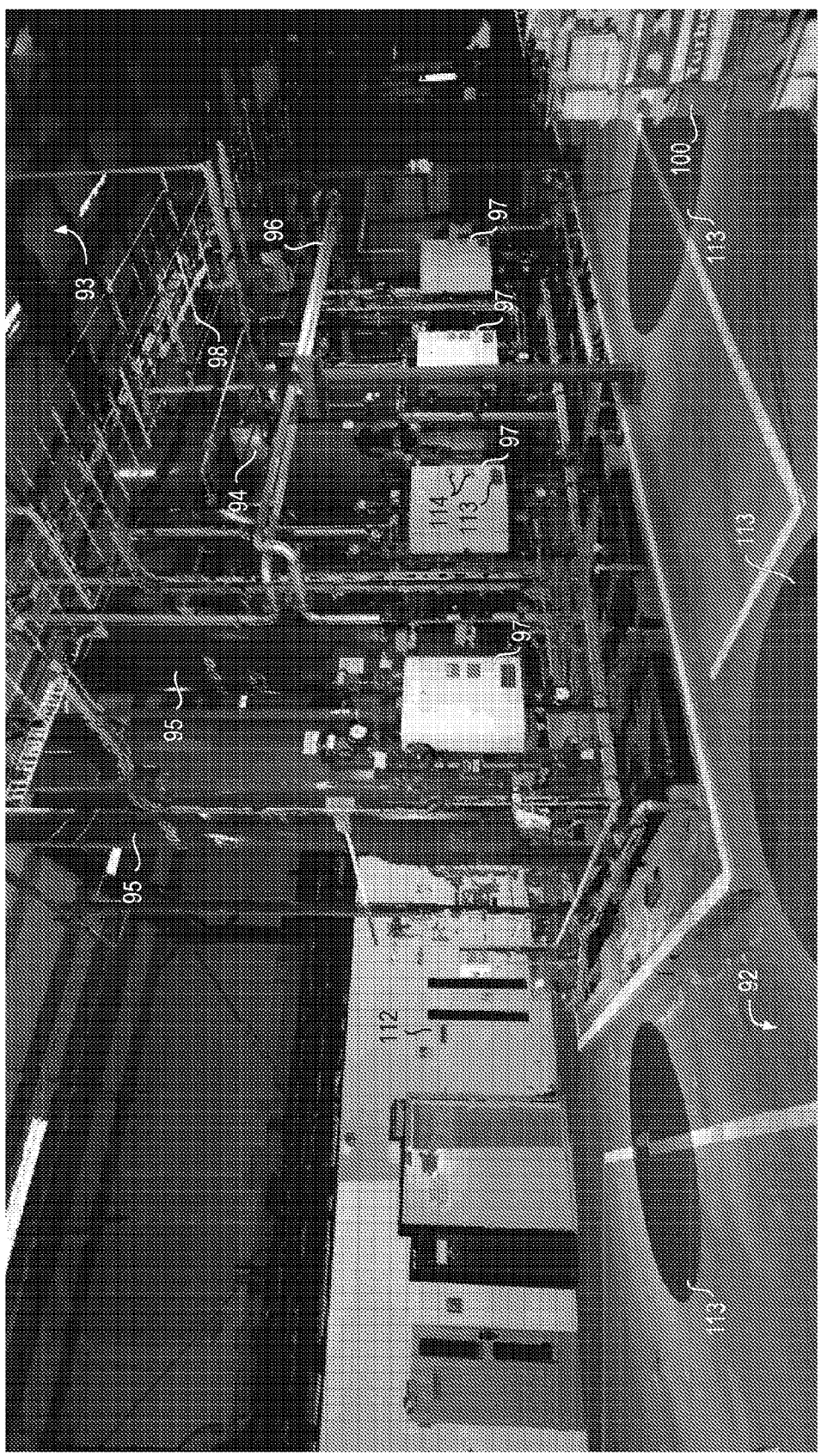
FIG. 28 shows a combined rendered image generated from individual scans of the point cloud shown in FIG. 25 from a different view point.

FIG. 28 shows another combined rendered image 28, 111' generated from the same point cloud shown in FIG. 25, but from a different view point.

As shown in FIG. 28, the image 111' shows the same objects, such as the control panels 97 and reaction vessels 95, but from another view point. The image 111 shown in FIG. 27 is taken from a point of view which is in front of doors 112 shown FIG. 28.

FIG. 28 shows the positions of the scanner 2 (FIG. 1) when carrying out a scan. Each dark circular region 113 corresponds to an area under the scanner 2 where the scanner 2 does not log points.

A comparison of the point cloud image 91 (FIG. 25) and the rendered image 111' (FIG. 29) shows a visual artefact associated with displaying an image 91 of point cloud generated from multiple scans. The rendered image 111' shows front faces of the control panels 97. Each front face bears a manufacturer label 113 and warning signs 114. However, these labels 113 and signs 114 are visible in the point cloud image 91 when they would not be visible in the real world.

By not aggregating scan data for individual scans into one, larger set of scan data, the system can take advantage of the order in which scan data are collected. Each set of scan data can be treated as a spherical displacement map and can be sampled to generate a tessellation pattern using computationally-efficient techniques. Further graphical processes, such as rasterization, can be performed and only then are images from different scans combined. Thus, the system allows an image of the scan data to be rendered efficiently and/or quickly, particularly if the graphics capabilities of a GPU are used.

It will be appreciated that various modifications may be made to the embodiments hereinbefore described. Such modifications may involve equivalent and other features which are already known in the design, manufacture and use of laser scan systems and/or graphics processing systems, and component parts thereof, and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of rendering an image of three-dimensional laser scan data, the method comprising:
    obtaining a plurality of sets of laser scan data for a set of scans as spherical displacement maps to a graphics processing unit, wherein each set of laser scan data corresponds to a different respective scan; and
    for each set of laser scan data, the graphics processing unit generating an image corresponding to the respective scan by:
        generating a tessellation pattern comprising a set of triangles by sampling a spherical displacement map corresponding to the respective set of laser scan data; and
        converting each triangle into raster data comprising pixels, each pixel including a value of depth;
    from different images each corresponding to a different respective set of laser scan data, the graphics processing unit generating a combined rendered image by:
        writing pixel data generated from a respective set of laser scan data to a depth buffer;
        comparing data of a pixel generated from a different respective set of laser scan data to pixel data written to the depth buffer; and
        rendering one image by combining an image generated from the respective set of laser scan data with an image generated from a different respective set of laser scan data.

2. A method according to claim 1, wherein obtaining each set of laser scan data for the set of scans as a spherical displacement map comprises:

receiving a set of laser scan data generated by a laser scanner at a given location; and copying a value of range for a given laser scan point at a given azimuth and a given elevation from the laser scan data into a respective texel of an at least two-dimensional texture at a texel position corresponding to the given azimuth and the given elevation.

3. A method according to claim 1, further comprising:

identifying discontinuities between adjacent points in each spherical displacement map; and marking said adjacent points.

4. A method according to claim 1, further comprising:

generating a set of normal maps in dependence upon said set of spherical displacement maps.

5. A method according to claim 4, wherein generating the set of normal maps comprises calculating a normal for each point in the set of spherical displacement maps and storing the normal in a set of normal maps.

6. A method according to claim 1, further comprising:

generating a blending texture in dependence upon each said spherical displacement map.

7. A method according to claim 1, further comprising:

generating a patch map for a given scan, the patch map comprising a plurality of patches.

8. A method according to claim 7, wherein the patch map includes a relative tessellation level for each patch and, the method comprising:

setting the relative tessellation level of a given patch in dependence upon discontinuities.

9. A method according to claim 1, further comprising:

determining whether a vertex forming part of a triangle in the tessellation pattern is marked as being on or adjacent to a discontinuity;

in dependence upon determining that the vertex is invalid, culling the triangle.

10. A non-transitory computer readable medium which stores a computer program for performing a method according to claim 1.

11. A computer system comprising:

memory;

at least one processing unit comprising at least one graphics processing unit;

wherein the memory stores a plurality of sets of laser scan data for a set of scans as spherical displacement maps, wherein each set of laser scan data corresponds to a different respective scan and for each set of laser scan data, the at least one graphics processing unit is (are) configured to generate an image corresponding to the respective scan by:

generating a tessellation pattern comprising a set of triangles by sampling a spherical displacement map corresponding to a set of laser scan data; and converting each triangle into raster data comprising pixels each pixel including a value of depth;

from different images, each corresponding to a different respective set of laser scan data, the graphics processing unit generating a combined rendered image by:

writing pixel data generated from a respective set of laser scan data to a depth buffer;

comparing a pixel generated from a different respective set of laser scan data to pixel data written to the depth buffer; and rendering one image by combining an image generated from the respective set of laser scan data with an image generated from a different respective set of laser scan data.

12. A computer system according to claim 11, wherein the at least one processing unit is configurable using a Microsoft® DirectX® 11 application programming interface.

* * * * *